United States Patent
Hoarty et al.

(10) Patent No.: US 6,305,020 B1
(45) Date of Patent: Oct. 16, 2001

(54) SYSTEM MANAGER AND HYPERTEXT CONTROL INTERFACE FOR INTERACTIVE CABLE TELEVISION SYSTEM

(75) Inventors: W. L. Hoarty, Morgan Hill; Bruce D. Nilo, Cupertino; Joshua W. Soske, Sunnyvale, all of CA (US)

(73) Assignee: ICTV, Inc., Los Gatos, CA (US)

( * ) Notice: Subject to any disclaimer, the term of this patent is extended or adjusted under 35 U.S.C. 154(b) by 0 days.

(21) Appl. No.: 08/987,405

(22) Filed: Dec. 9, 1997

Related U.S. Application Data

(63) Continuation of application No. 08/551,461, filed on Nov. 1, 1995, now Pat. No. 5,883,661.
(60) Provisional application No. 60/033,301, filed on Dec. 10, 1996.

(51) Int. Cl.[7] .................................................. H04N 7/173
(52) U.S. Cl. ............................................. 725/95; 725/116
(58) Field of Search ................................. 345/327; 348/7, 348/12, 13; 455/4.2, 5.1; 709/217, 218, 219; 725/116, 117, 114, 87, 91, 93, 95; H04N 7/173, 7/16

(56) References Cited

U.S. PATENT DOCUMENTS

| | | | |
|---|---|---|---|
| 3,889,050 | 6/1975 | Thompson | 178/5.1 |
| 3,934,079 | 1/1976 | Barnhart | 178/5.1 |

(List continued on next page.)

FOREIGN PATENT DOCUMENTS

| | | |
|---|---|---|
| 682776 | 3/1964 | (CA) . |
| 0 568 453 A1 | 11/1993 | (EP) . |
| 0 594 350 A1 | 4/1994 | (EP) . |
| WO93/22877 | 11/1993 | (WO) . |

OTHER PUBLICATIONS

Picture Signal Supply System, To simplify the transmission means to lots of terminal equipments by utilizing one transmission line and extracting a required picture among pictures subject to frequency multiplex to the transmission line. Jul. 28, 1986, Michio Kuribayashi.

(List continued on next page.)

*Primary Examiner*—Chris Grant
(74) *Attorney, Agent, or Firm*—Bromberg & Sunstein LLP

(57) ABSTRACT

A system manager for use with an interactive cable system. The cable system has (i) an information service network for delivering information services to subscriber televisions, (ii) a plurality of home interface controllers, each home interface controller associated with a subscriber television and having a data transceiver operative over a data communications link to the headend, (iii) a plurality of subscriber selection devices, each such device associated with a home interface controller and in communication with the data transceiver thereof, for permitting subscriber interaction, and (iv) a plurality of interactive controllers, disposed at the headend, each interactive controller in assignable television communication over the network with a subscriber television and in data communication with a subscriber selection device. The system manager includes a call set-up server to receive and handle an initial data exchange with a calling home interface controller; a first service allocation server to pass communication and control associated with the calling home interface controller to one of a plurality of first application processors, with each first application processor being one of the interactive controllers, for providing a first information service; and a second service allocation server to pass communication and control associated with a home interface controller seeking a second information service to an available one of a plurality of second application processors, with each second application processor being one of the interactive controllers, to provide the second information service. The call-set up server, first service allocation server, and second service allocation server operate as independent processes.

11 Claims, 19 Drawing Sheets

U.S. PATENT DOCUMENTS

| | | | |
|---|---|---|---|
| 3,997,718 | 12/1976 | Ricketts et al. ................... 178/6.8 |
| 4,002,843 | 1/1977 | Rackman ................... 179/15 AL |
| 4,077,006 | 2/1978 | Nicholson ................... 325/308 |
| 4,145,720 | 3/1979 | Weintraub et al. ................... 358/194 |
| 4,186,438 | 1/1980 | Benson et al. ................... 364/200 |
| 4,245,245 | 1/1981 | Matsumoto et al. ................... 358/122 |
| 4,247,106 | 1/1981 | Jeffers et al. ................... 273/85 G |
| 4,264,924 | 4/1981 | Freeman ................... 358/86 |
| 4,302,771 | 11/1981 | Gargini ................... 358/86 |
| 4,367,557 | 1/1983 | Stern et al. ................... 455/4 |
| 4,395,780 | 7/1983 | Gohm et al. ................... 455/607 |
| 4,450,477 | 5/1984 | Lovett ................... 358/86 |
| 4,454,538 | 6/1984 | Toriumi ................... 358/86 |
| 4,475,123 | 10/1984 | Dumbauld et al. ................... 358/114 |
| 4,491,983 | 1/1985 | Pinnow et al. ................... 455/612 |
| 4,507,680 | 3/1985 | Freeman ................... 358/86 |
| 4,509,073 | 4/1985 | Baran et al. ................... 358/86 |
| 4,533,948 | 8/1985 | McNamara et al. ................... 358/122 |
| 4,536,791 | 8/1985 | Campbell et al. ................... 358/122 |
| 4,538,174 | 8/1985 | Gargini et al. ................... 358/86 |
| 4,573,072 | 2/1986 | Freeman ................... 358/86 |
| 4,602,279 | 7/1986 | Freeman ................... 358/86 |
| 4,625,235 | 11/1986 | Watson ................... 358/86 |
| 4,633,462 | 12/1986 | Stifle et al. ................... 370/85 |
| 4,695,880 | 9/1987 | Johnson et al. ................... 358/86 |
| 4,706,121 | 11/1987 | Young ................... 358/142 |
| 4,734,764 | 3/1988 | Pocock et al. ................... 358/86 |
| 4,750,036 | 6/1988 | Martinez ................... 358/147 |
| 4,760,442 | 7/1988 | O'Connell et al. ................... 358/86 |
| 4,792,849 | 12/1988 | McCalley et al. ................... 358/86 |
| 4,805,134 | 2/1989 | Calo et al. ................... 364/900 |
| 4,821,102 | 4/1989 | Ichikawa et al. ................... 358/183 |
| 4,829,372 | 5/1989 | McCalley et al. ................... 358/86 |
| 4,847,698 | 7/1989 | Freeman ................... 358/343 |
| 4,847,700 | 7/1989 | Freeman ................... 358/343 |
| 4,860,379 | 8/1989 | Schoenegerger et al. ................... 455/5 |
| 4,889,369 | 12/1989 | Albrecht ................... 285/39 |
| 4,890,320 | 12/1989 | Monslow et al. ................... 380/10 |
| 4,901,367 | 2/1990 | Nicholson ................... 455/5 |
| 4,918,516 | 4/1990 | Freeman ................... 358/84 |
| 4,941,040 | 7/1990 | Pocock et al. ................... 358/86 |
| 4,947,244 | 8/1990 | Fenwick et al. ................... 358/86 |
| 4,961,211 | 10/1990 | Tsugane et al. ................... 379/54 |
| 5,014,125 | 5/1991 | Pocock et al. ................... 358/86 |
| 5,027,400 | 6/1991 | Baji et al. ................... 380/20 |
| 5,051,720 | 9/1991 | Kittirutsunetorn ................... 340/310 R |
| 5,051,822 | 9/1991 | Rhoades ................... 358/86 |
| 5,083,800 | 1/1992 | Lockton ................... 273/439 |
| 5,088,111 | 2/1992 | McNamara et al. ................... 375/18 |
| 5,093,718 | 3/1992 | Hoarty et al. ................... 358/84 |
| 5,119,188 | 6/1992 | McCalley et al. ................... 358/86 |
| 5,130,792 | 7/1992 | Tindell et al. ................... 358/85 |
| 5,133,079 | 7/1992 | Ballantyne et al. ................... 455/4.1 |
| 5,136,411 | 8/1992 | Paik et al. ................... 359/125 |
| 5,172,413 | 12/1992 | Bradley et al. ................... 380/20 |
| 5,191,410 | 3/1993 | McCalley et al. ................... 358/86 |
| 5,220,420 | 6/1993 | Hoarty et al. ................... 358/86 |
| 5,231,494 | 7/1993 | Wachob ................... 358/146 |
| 5,236,199 | 8/1993 | Thompson, Jr. ................... 273/439 |
| 5,253,341 | 10/1993 | Rozmanith et al. ................... 395/200 |
| 5,262,854 | 11/1993 | Ng ................... 358/133 |
| 5,319,455 | 6/1994 | Hoarty et al. ................... 348/7 |
| 5,359,601 | 10/1994 | Wasilewski et al. ................... 370/73 |
| 5,371,532 | 12/1994 | Gelman et al. ................... 348/7 |
| 5,404,393 | 4/1995 | Remillard ................... 379/96 |
| 5,412,720 | 5/1995 | Hoarty ................... 380/15 |
| 5,418,559 | 5/1995 | Blahut ................... 348/10 |
| 5,422,674 | 6/1995 | Hooper et al. ................... 348/409 |
| 5,442,389 | 8/1995 | Blahut et al. ................... 348/7 |
| 5,446,490 | 8/1995 | Blahut et al. ................... 348/7 |
| 5,469,283 | 11/1995 | Vinel et al. ................... 359/118 |
| 5,469,431 | 11/1995 | Wendorf et al. ................... 370/50 |
| 5,481,542 * | 1/1996 | Logston et al. ................... 370/94.2 |
| 5,495,295 | 2/1996 | Long ................... 348/563 |
| 5,539,449 | 7/1996 | Blahut et al. ................... 348/7 |
| 5,548,340 | 8/1996 | Bertram ................... 348/559 |
| 5,557,316 | 9/1996 | Hoarty et al. ................... 348/7 |
| 5,561,708 | 10/1996 | Remillard ................... 379/96 |
| 5,587,734 | 12/1996 | Lauder et al. ................... 348/10 |
| 5,589,885 | 12/1996 | Ooi ................... 348/416 |
| 5,594,507 | 1/1997 | Hoarty ................... 348/584 |
| 5,608,446 | 3/1997 | Carr et al. ................... 348/6 |
| 5,621,464 | 4/1997 | Teo et al. ................... 348/390 |
| 5,631,693 | 5/1997 | Wunderlich et al. ................... 348/7 |
| 5,631,846 | 5/1997 | Szurkowski ................... 364/514 B |
| 5,668,599 | 9/1997 | Cheney et al. ................... 348/402 |
| 5,740,307 | 4/1998 | Lane ................... 386/68 |
| 5,754,941 * | 5/1998 | Sharpe et al. ................... 455/5.1 |
| 5,905,522 * | 5/1999 | Lawler ................... 348/7 |
| 5,917,822 * | 6/1999 | Lyles et al. ................... 370/395 |
| 5,966,163 * | 10/1999 | Lin et al. ................... 348/12 |

OTHER PUBLICATIONS

Integrating Entertainment and Voice on the Cable Network by Earl Langenberg 0 TeleWest International and Ed Callahan—ANTEC.

Tapped Fiber Vs. Fiber–Reinforced Coaxial CATV Systems by David Large, Feb. 1990.

Topology of Videotex Networks, 1983 by Prentice–Hall, Inc.

Two–way applications for cable television systems in the '70s, IEEE Spectrum, Nov. 1971.

Insight advertisement "In two years this is going to be the most watched program on TV"—On touch VCR programming.

"INDAX: An Operational Interactive Cabletext System", Ellis, M.L., et al, IEEE Journal on Selected Areas in Communications, vol. sac–1, No. 2, Feb. 1983, pp. 285–294.

"The Broadband Solution—Metropolitan CATV Networks" by Frezza, W., Proceedings of Videotex '84, Apr. 1984, all pages.

ARIDEM—a multi–service broadband access demonstator XP 000629578, by Gerhard Bogi, Lorens Almehag, Ulf V. Johansson and Lars Andersson Ericsson Review No. 3, 1996.

A Passive Optical/Coax Hybrid Network Architecture for Delivery of CATV, Telephony and Data Services, by Dr. M. Farooque Mesiya, Pres. & CEO American Lightwave Systems, Inc., 1993 NCTA Technical Papers—358–364.

* cited by examiner

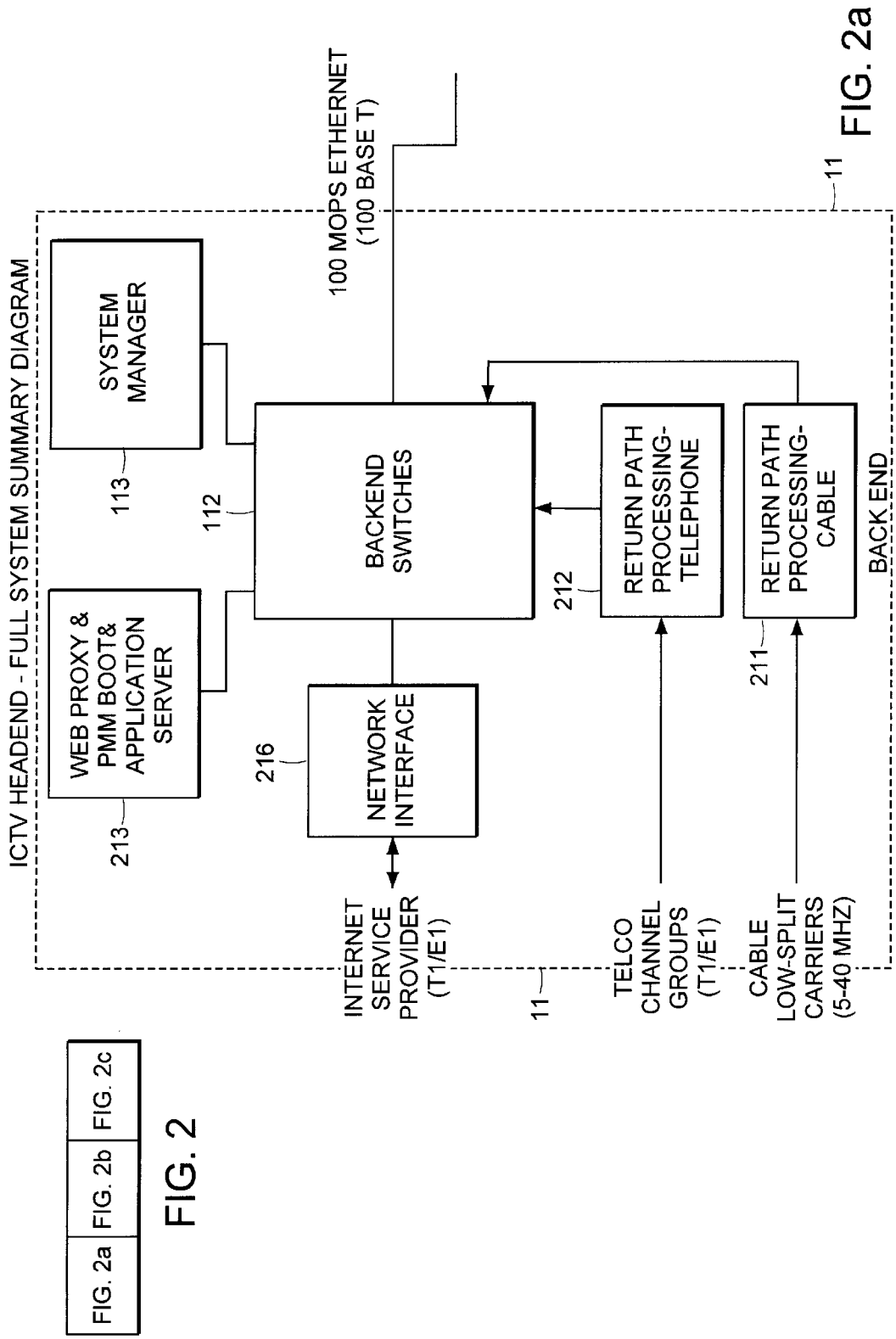

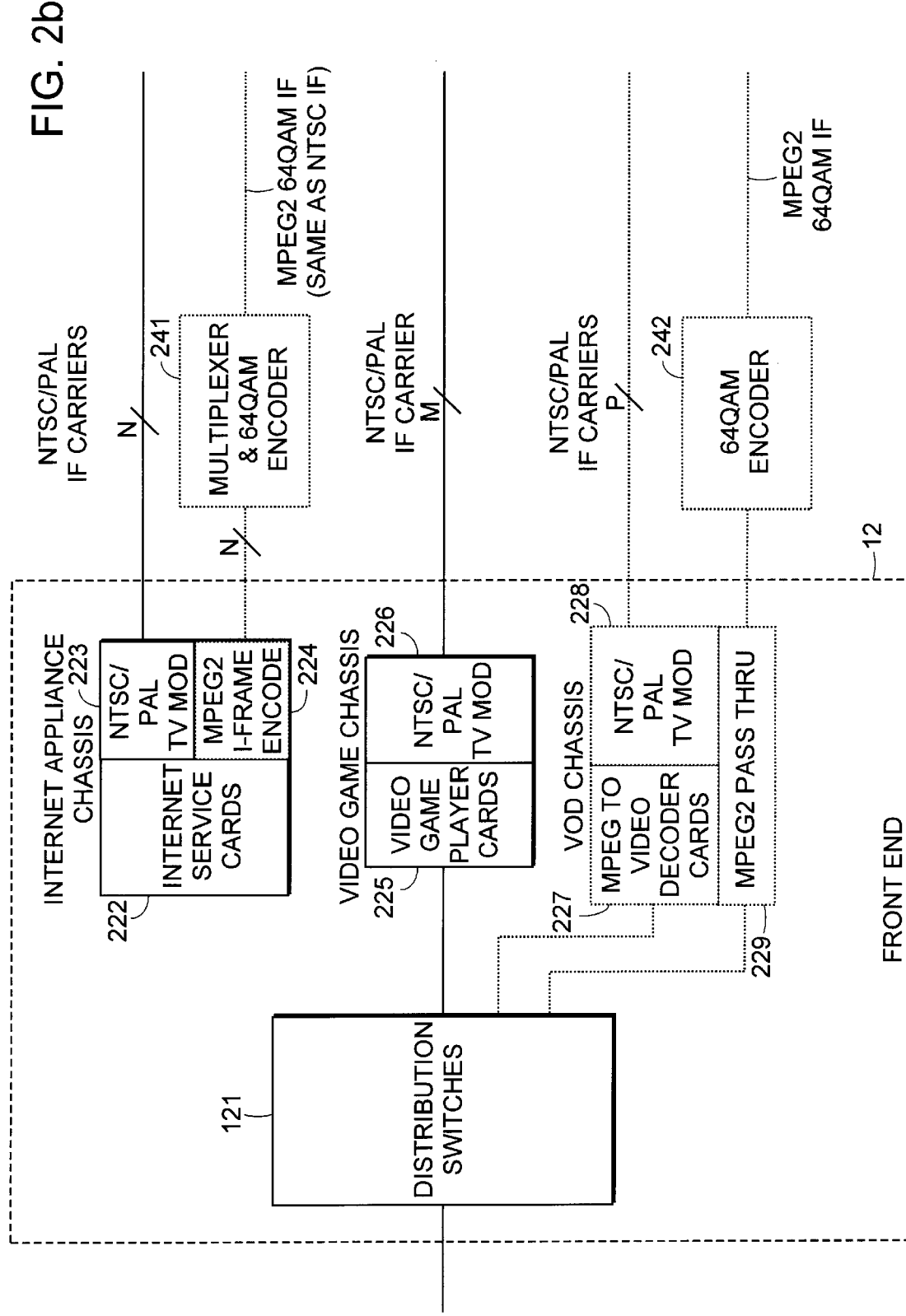

SYSTEM MANAGER AND HYPERTEXT CONTROL INTERFACE FOR INTERACTIVE CABLE TELEVISION SYSTEM

This application is a continuation-in-part of U.S. patent application Ser. No. 08/551,461, filed Nov. 1, 1995, now U.S. Pat. No. 5,883,661 and bases priority from U.S. Provisional Application No. 60/033,301, filed Dec. 10, 1996. The full disclosures of U.S. patent application Ser. No. 08/551,461 and U.S. Provisional Application No. 60/033,301 are hereby incorporated by reference herein.

BACKGROUND ART

The invention relates to cable television systems, and more particularly to such systems capable of providing interactive services provided over a cable television network.

Bandwidth problems have long restricted the ability of cable television systems to provide information services to subscribers. Although a coaxial cable system may permit a cable system operator to provide, for example, 50 television channels, each 6 MHZ wide, with a total bandwidth of 300 MHZ, this total bandwidth is insufficient to permit an arrangement wherein each subscriber may have, in addition to these 50 channels, an interactive information service that functions independently of interactive information services to all other subscribers and provides full color video, motion typical of movies or television, and sound.

The reason for the insufficiency in bandwidth is apparent on a consideration of the demands on the system. Typically a subscriber on a cable system obtains information services over a communication path that starts at the head end, proceeds over one of typically a number of trunks, and then over one of a number of feeders, and then over one of a number of taps. Each feeder may have, for example, fifty or more subscribers, and each trunk might serve a hundred or more feeders. The result is that 5000 subscribers per trunk is not atypical. Thus merely to provide a private one-way information service, and nothing else, to each of these 5000 subscribers would require the trunk to carry 5000 different signals, each using about 6 MHZ of bandwidth, and would alone require a trunk bandwidth of 30 GHz, which is nearly two orders of magnitude greater than provided by a typical coaxial cable system.

The use of fiber optic trunks can assist in providing additional bandwidth. but to the extent that coaxial cable secondary trunks and feeders are used in a hybrid fiber-cable system, bandwidth limitations may continue to pose problems. While video compression schemes may assist in bringing the bandwidth requirements within more practical limits, each subscriber would then need to be provided with his own decompression unit.

Another problem lies in how to handle the switching and computing demands on the head end to provide separate and private information service to potentially hundreds of thousands of subscribers simultaneously.

One approach to the above problem involves placing a digital computer in the home of each subscriber to provide interactive service, where the computer operates over a traditional network of computers. However, with the above approach, a large capital investment is needed to provide each subscriber with a computer.

SUMMARY OF THE INVENTION

In a preferred embodiment, the present invention provides a system manager for use with an interactive cable system. The cable system has (i) an information service network for delivering information services to subscriber televisions, (ii) a plurality of home interface controllers, each home interface controller associated with a subscriber television and having a data transceiver operative over a data communications link to the headend, (iii) a plurality of subscriber selection devices, each such device associated with a home interface controller and in communication with the data transceiver thereof, for permitting subscriber interaction, and (iv) a plurality of interactive controllers, disposed at the headend, each interactive controller in assignable television communication over the network with a subscriber television and in data communication with a subscriber selection device.

The system manager has a call set-up server to receive and handle an initial data exchange with a calling home interface controller; and a first service allocation server to pass communication and control associated with the calling home interface controller to one of a plurality of first application processors, each first application processor being one of the interactive controllers, to provide a first information service; wherein the call set-up server and the first service allocation server operate as independent processes.

In a further embodiment, the system manager also has a second service allocation server to pass communication and control associated with a home interface controller seeking a second information service to an available one of a plurality of second application processors. Each second application processor is one of the interactive controllers, and provides the second information service. The second service allocation server operates as an independent process. The first service allocation server maintains a list of available first application processors and the second service allocation server maintains a list of available second application processors.

In a further embodiment, (1) an interactive controller in assigned television communication with the calling home interface controller causes display on the subscriber television associated with the calling home interface controller of a page having at least one hyperlink to an additional page and (2) selection of such a hyperlink by the selection device associated with the calling home interface controller causes a transfer (which may be direct or indirect) between one of the first and second service allocation servers to the other of them so as to cause a change in the information service provided to such subscriber television. In this embodiment, the page and the additional page are created in HTML format, although any hyperlink arrangement may be employed. The effect is that a subscriber may use an Internet browser type of display to choose among various information services, not just Internet service.

In an alternative embodiment of the invention, there is provided a cable system having (i) an information service network, for delivering information services to subscriber televisions, (ii) a plurality of home interface controllers, each home interface controller associated with a subscriber television and having a data transceiver operative over a data communications link to the headend, (iii) a plurality of subscriber selection devices, each such device associated with a home interface controller and in communication with the data transceiver thereof, for permitting subscriber interaction, and (iv) a plurality of interactive controllers, disposed at the headend, each interactive controller in assignable television communication over the network with a subscriber television and in data communication with a subscriber selection device. The subscriber selection device may communicate over the data link each time a cursor movement or other selection activity is effectuated; alternatively, the data link can cause periodic transmission of cursor coordinates when a critical selection activity has occurred, such as pressing a "select" button.

The system manager has a first service allocation server to pass communication and control associated with a calling home interface controller to one of a plurality of first application processors, where each application processor is one of the interactive controllers, to provide a first information service. The system manager also has a second service allocation server to pass communication and control associated with a home interface controller seeking a second information service to an available one of a plurality of second application processors, each second application processor being one of the interactive controllers, to provide the second information service; where each of the first and second service allocation servers operates as an independent process. The system manager also is such that (1) the interactive controller in assigned television communication with the calling home interface controller causes to display on the subscriber television associated with the calling home interface controller a page having at least one hyperlink to an additional page and (2) the selection of such a hyperlink by the selection device associated with the calling home interface controller causes a transfer (indirect or direct hand-off) between one of the first and second service allocation servers to the other of them so as to cause a change in the information service provided to the subscriber television. The system manager is also such that the page and the additional page are created in HTML format.

The interactive cable system includes (i) an information service network, for delivering information services to subscriber televisions, (ii) a plurality of home interface controllers, each home interface controller associated with a subscriber television and having a data transceiver operative over a data communications link to the headend, (iii) a plurality of subscriber selection devices, each such device associated with a home interface controller and in communication with the data transceiver thereof, for permitting subscriber interaction, and (iv) a plurality of interactive controllers, disposed at the headend, where each interactive controller is in assignable television communication over the network with a subscriber television and in data communication with a subscriber selection device.

In yet another embodiment, the system manager has a first service allocation server to pass communication and control associated with a calling home interface controller to one of a plurality of first application processors, where each application processor is one of the interactive controllers, to provide a first information service; a second service allocation server to pass communication and control associated with a home interface controller seeking a second information service to an available one of a plurality of second application processors, where each second application processor is one of the interactive controllers, to provide the second information service; wherein each of the first and second service allocation servers operates as an independent process; and wherein (1) an interactive controller in assigned television communication with the calling home interface controller causes display on the subscriber television associated with the calling home interface controller of a page having at least one hyperlink to an additional page and (2) the selection of such a hyperlink by the selection device associated with the calling home interface controller causes a transfer (either indirect or direct hand-off) between one of the first and second service allocation servers to the other of them so as to cause a change in the information service provided to such subscriber television. Further the system manager is such that the page and the additional page are created in HTML format.

In yet another embodiment, the system manager and cable system are such that the cable system has (i) an information service network, for delivering information services to subscriber televisions, (ii) a plurality of home interface controllers, each home interface controller associated with a subscriber television and having a data transceiver, operative over a data communications link to the headend, with a transmitter having a tunable carrier frequency; (iii) a plurality of subscriber selection devices, each such device associated with a home interface controller and in communication with the data transceiver thereof, for permitting subscriber interaction, and (iv) a plurality of interactive controllers, disposed at the headend, each interactive controller in assignable television communication over the network with a subscriber television and in data communication with a subscriber selection device.

The system manager has a data path manager for maintaining a list of available data channels for upstream communications from a calling home interface controller to the headend and preventing simultaneous use of a channel by more than one home interface controller; and an assignment system by which the transmitter in the data transceiver of a calling home interface controller is caused to tune to an available channel. (A "channel" here may be a time slice, a frequency slice, or a code slice, although in a preferred embodiment we use a frequency slice.) The system manager is also such that the assignment system includes a hailing channel over which the transmitter in the data transceiver of a calling home interface controller seeks assignment by the data path manager of an available channel. Further, the system manager is such that the assignment system includes an arrangement for the periodic broadcast, from the headend over a downstream portion of the data link to the home interface controllers, identifying of available channels, and the home interface controller has a rule for picking one of the available channels for use by the transmitter in the data transceiver of a calling home interface controller.

The servers and controllers referred to herein may be implemented as distinct hardware elements or they may be virtual elements in one or more computing devices.

DETAILED DESCRIPTION OF SPECIFIC EMBODIMENTS

For the purposes of the description herein and the claims that follow it, unless the context otherwise requires, the terms "cable television environment" and "cable television system" include all integrated systems for delivery of any information service to subscribers for use in connection with their televisions. These include conventional cable television systems utilizing coaxial cable for distribution primarily of broadcast and paid television programming, cable television systems using fiber optics and mixed fiber optic-coaxial cable, as well as other means for distribution of information services to subscribers. Similarly, unless the context otherwise requires, the term "information service" includes any service capable of being furnished to a television viewer having an interface permitting (but not necessarily requiring) interaction with a facility of the cable provider, including but not limited to an interactive information service, video on demand, local origination service, community event service, regular broadcast service, etc. "Television communication" means providing an information service via a television information signal. A "television information signal" is any signal that may be utilized by a television for video display, regardless of the form, including a standard NTSC-modulated rf carrier, an MPEG-compressed digital data stream, or any other format. "Interactive television service" means an information service that utilizes an interface affording two-way communication with a facility of the cable provider. When a node is said to be in an "interactive mode," it means that the node is providing an information service to the home interface controller; the home interface controller may, but need not, be furnishing data to the node as to what information service to provide.

Figure 1:
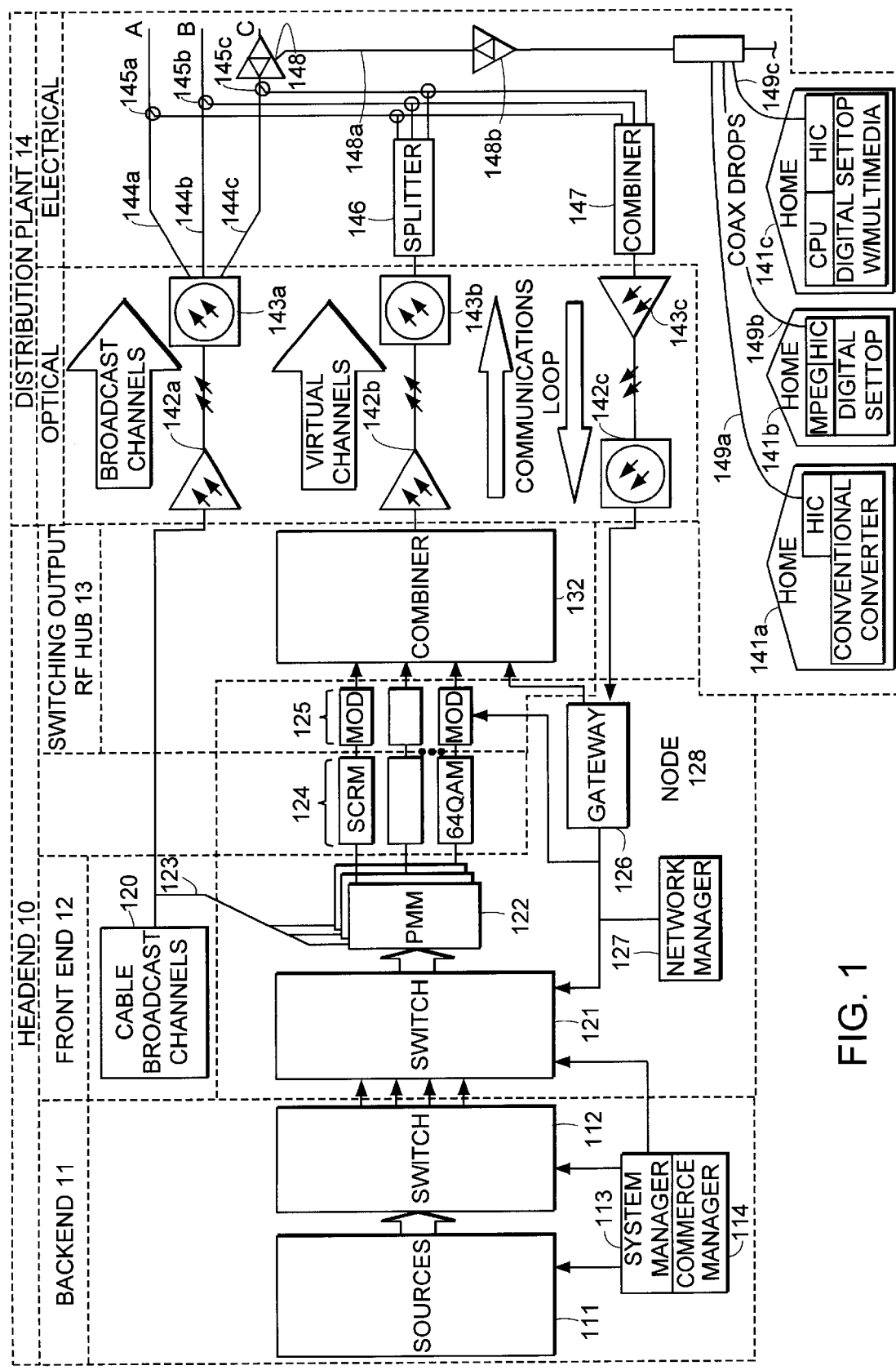
FIG. 1 is a block diagram of a preferred embodiment of a cable television system in accordance with the present invention, for providing information content with interactivity.

FIG. 1 illustrates an embodiment of a cable television system in accordance with a preferred embodiment of the present invention for providing information services. The system of this figure is generally similar to that described in U.S. Pat. No. 5,550,578, entitled "Interactive and Conventional Television Information System", for an invention by Hoarty and Soske; such patent is hereby incorporated by reference herein. The cable television system comprises headend and distribution plant 14. Headend 10 comprises back end 11, front end 12, and switching output RF hub 13. In back end 11, information source 111 provides information source content via switch 112 to front end 12. In front end 12, information content is switched via switch 121 to a plurality of personal multi-media modules (PMMs) 122, usage of which is allocated on a demand basis. Conventional cable broadcast channels 120 are routed over main fiber trunks 144a, 144b, and 144c. Analog television information signals from appropriate analog PMMs are processed by scrambling at 124 and modulating at modulators 125, whereas digital television information signals from appropriate digital PMMs are processed by combining them into a composite QAM (quadrature amplitude modulation) signal before going to modulators 125. Modulators 125 and combiner 132 form part of switching output radio frequency (RF) hub 13. The modulators are preferably capable of modulating a carrier that is tunable by the network manager 127, so that any given modulator may be configured to best handle demands placed on the system.

Depending on the capacity of the cable system and the information services sought to be delivered, some of the cable broadcast channels 120 may be provided over path 123 to the PMMs. Additionally, the path 123 allows the PMMs operating interactively to permit a subscriber to make overlays on otherwise conventional cable television programming. The output of items 125 are then combined by combiner 132 and fed to the interactive trunk 142b. The cable distribution plant 14 includes bridger amplifiers 148, feeders 148a, feeder amplifiers 148b, and cable drops such as 149a, 149b, and 149c serving homes 141a, 141b, and 141c.

The information services can be provided to a subscriber over virtual channels in which the channel number changes for different interactive information services, even though the various information services may be provided over a fixed frequency input to the set top, with the control data from the subscriber's set top causing the back end to supply a different information service as the subscriber appears to be changing the channel.

Figure 8:
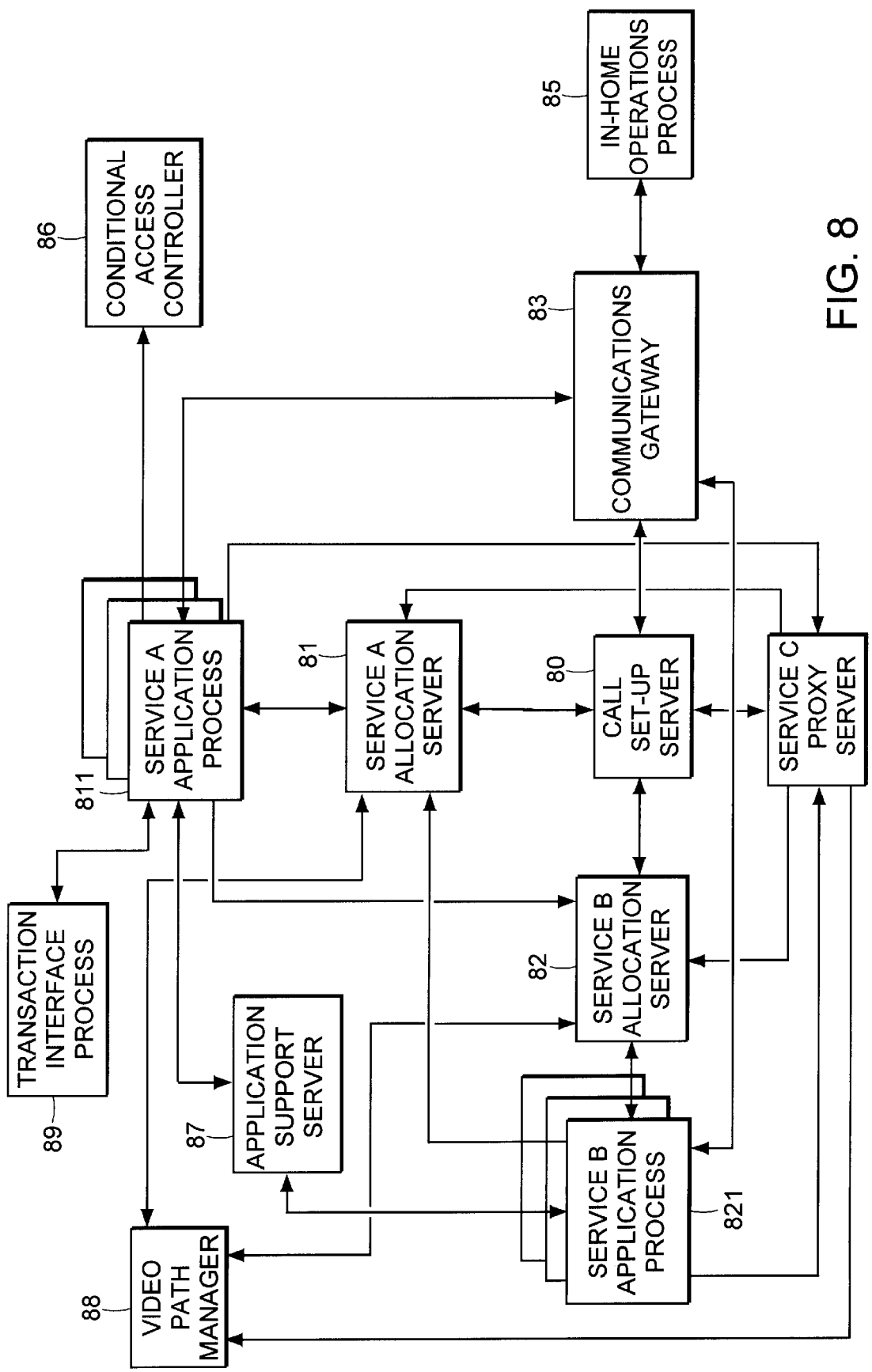
FIG. 8 illustrates a system diagram for the system manager of FIG. 1.
Figure 9:
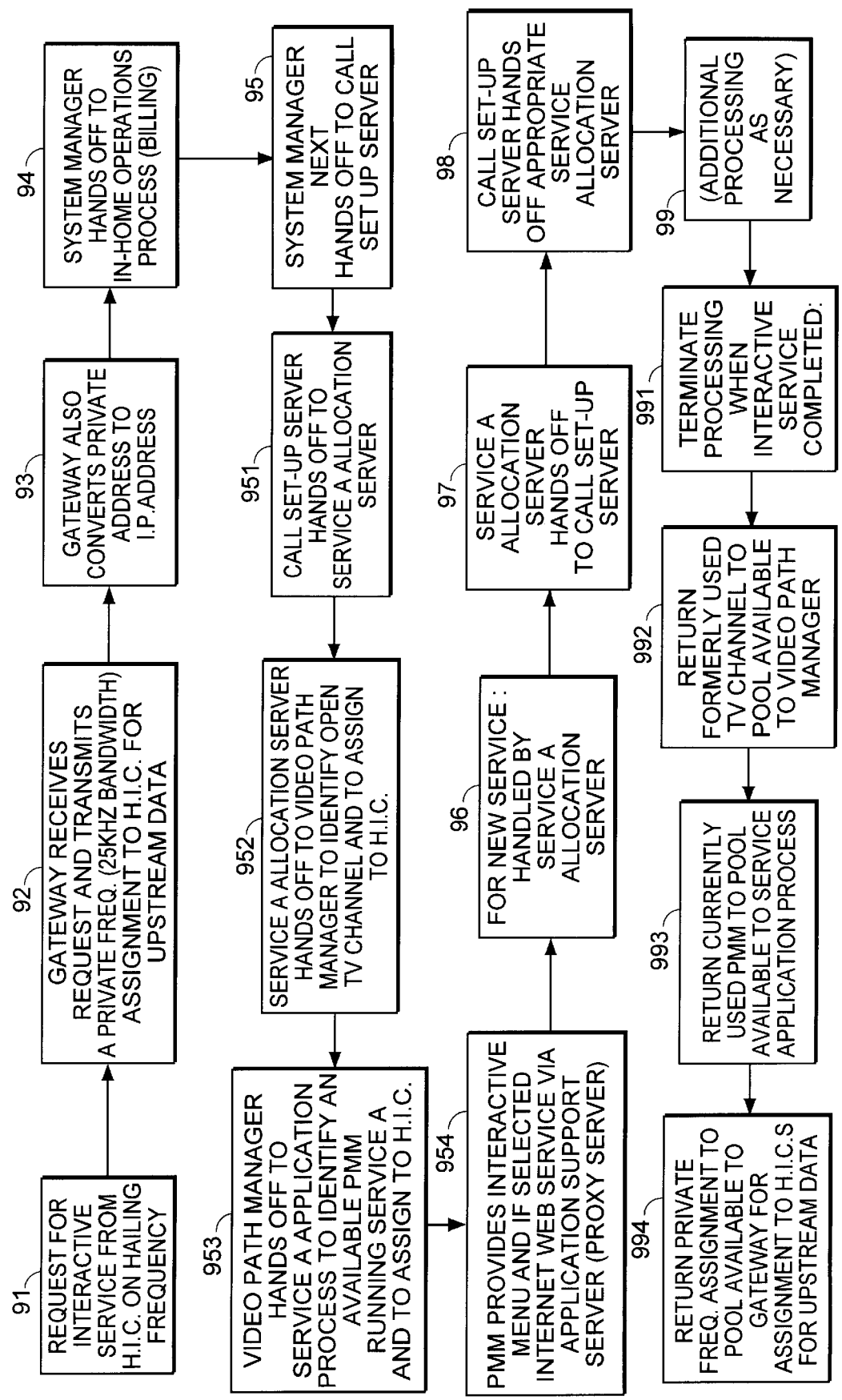
FIG. 9 illustrates a flow diagram for a call set-up and tear down procedure as shown in FIG. 8.

System manager 113 in back end 11 provides for the allocation of resources to permit interactive services with a user, as well as procedures for call set-up and tear down, and is discussed in more detail in reference to FIGS. 8 and 9. Commerce manager 114 manages real-time transactions and converts billing to a batch format for handling by legacy systems.

Figure 2C:
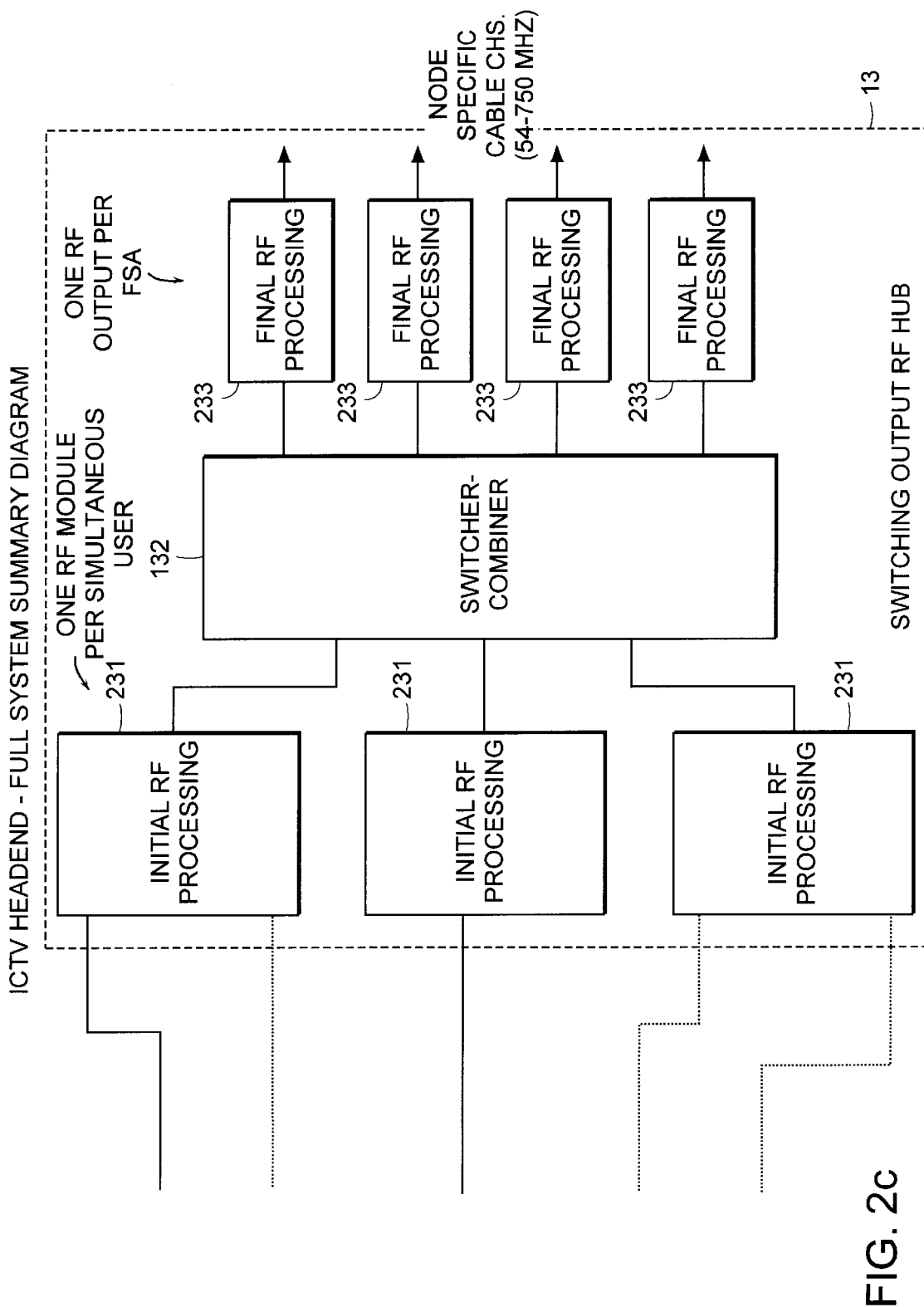
FIG. 2 is a block diagram of an embodiment of the headend of FIG. 1, showing the back end, front end, and switching output RF hub of FIG. 1.

In FIG. 2 are illustrated back end 11, front end 12, and switching output RF hub 13 of FIG. 1. In back end 11, network interface 216 is in communication with an internet service provider, return path processing telephone 212 is in communication with telephone lines, and return path processing cable 211 is in communication with signals provided over a cable return path. Network interface 216, return path processing telephone 212, and return path processing cable 211 are also in communication with back end switches 112. Back end switches 112 are in communication with web proxy and PMM boot and application server 213 as well as system manager 113, and are in communication with front end 12 via distribution switches 121. Because the PMMs in a preferred embodiment are diskless and lack ROM with stored software necessary for bootup, server 213 provides booting-up for the PMMs. Also, server 213 provides a web proxy server function so that information downloaded from a remote server on the Internet is quickly cached on server 213.

Distribution switches 121 provide communication signals and control signals to PMMs, which in FIG. 2 are illustrated by internet service cards 222, video game player cards 225, and MPEG-to-video decoder cards 227. NTSC/PAL TV modulator cards 223, 226 and 228 provide television signals from the outputs of Internet service card 222, video game player card 225, and MPEG-to-video decoder card 227, respectively, in the form of NTSC or PAL IF (intermediate frequency) signals to switching output RF hub 13. To provide MPEG2 encoded digital signals directly to users, MPEG2 pass-thru 229 may be implemented by which MPEG-to-video decoder card 227 and NTSC/PAL TV modulator card 228 are bypassed; in such case 64-QAM encoding is performed before processing by switching output RF hub 13. Within switching output RF hub 13, initial RF processing 231 is performed in which there is one RF module per simultaneous user, and the output of RF processing 231 is combined via switcher-combiner 132, and final RF processing is performed by 233.

Figure 3:
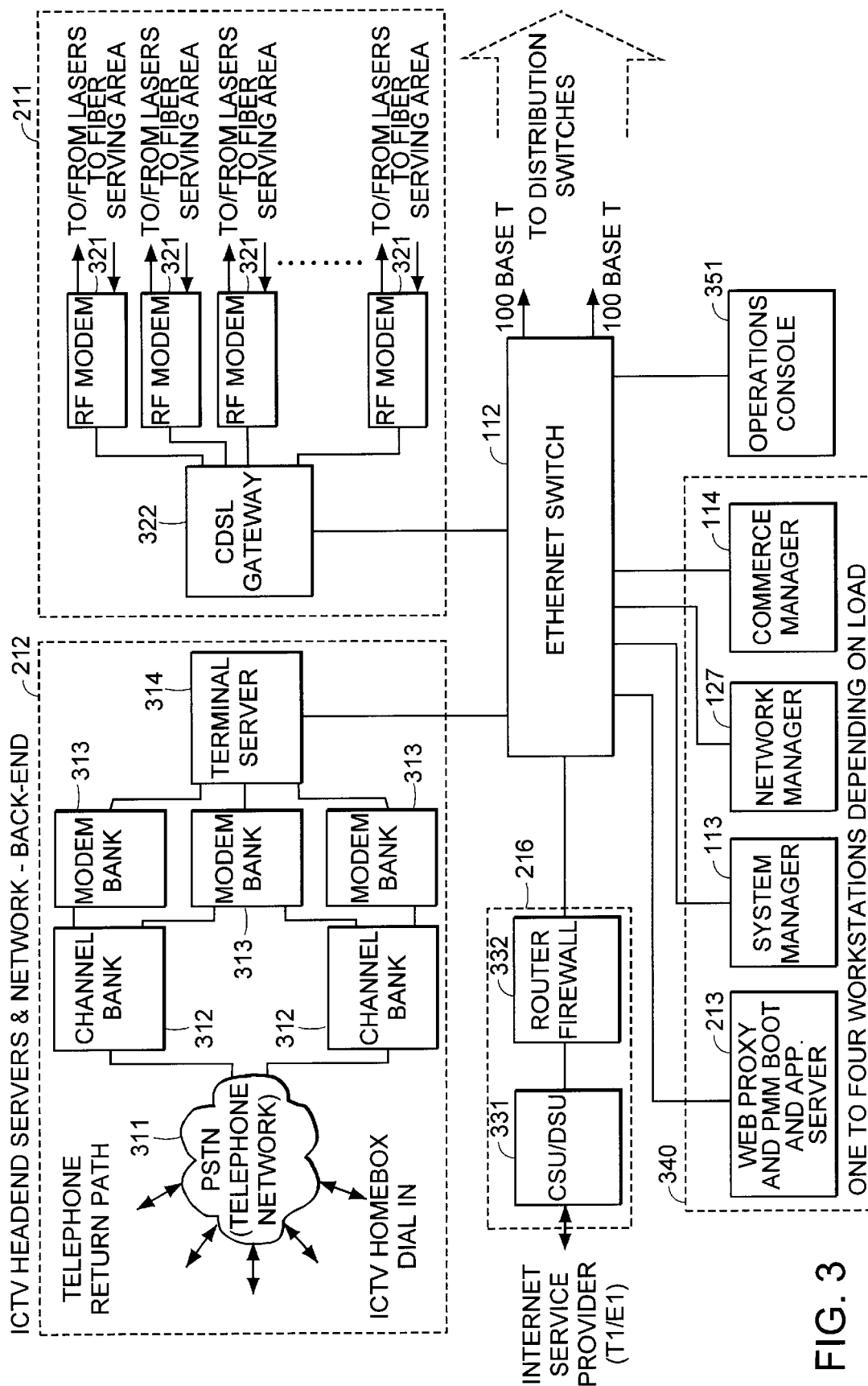
FIG. 3 illustrates an embodiment of the back end of FIG. 1.

An embodiment of back end 11 is shown in more detail in FIG. 3. Return path processing cable 211 is provided by CDSL gateway 322 in communication with users via RF modems 321. Return path processing telephone 212 is provided by terminal server 314 in communication with telephone network 311 via channel banks 312 and modem banks 313. Terminal server 314 and CDSL gateway 322 are in communication with back end switches 112, which in FIG. 3 are indicated as an Ethernet switch. In the alternative presently preferred embodiment, the terminal server 314 and CDSL gateway 322 may be replaced by return data path switches which distribute communications to the assigned PMMs 122 without imposing on the back end switches 112. Network interface 216 is provided by router firewall 332 and CSU/DSU (customer service unit/data service unit) 331. Router firewall is in communication with ethernet switch 112. Also shown in FIG. 3 are web proxy and PMM boot and application server 341, system manager 113, network manager 127, and commerce manager 114 in communication with ethernet switch 112. Also shown in FIG. 3 are operations console 351 in communication with ethernet switch 112.

Figure 4:
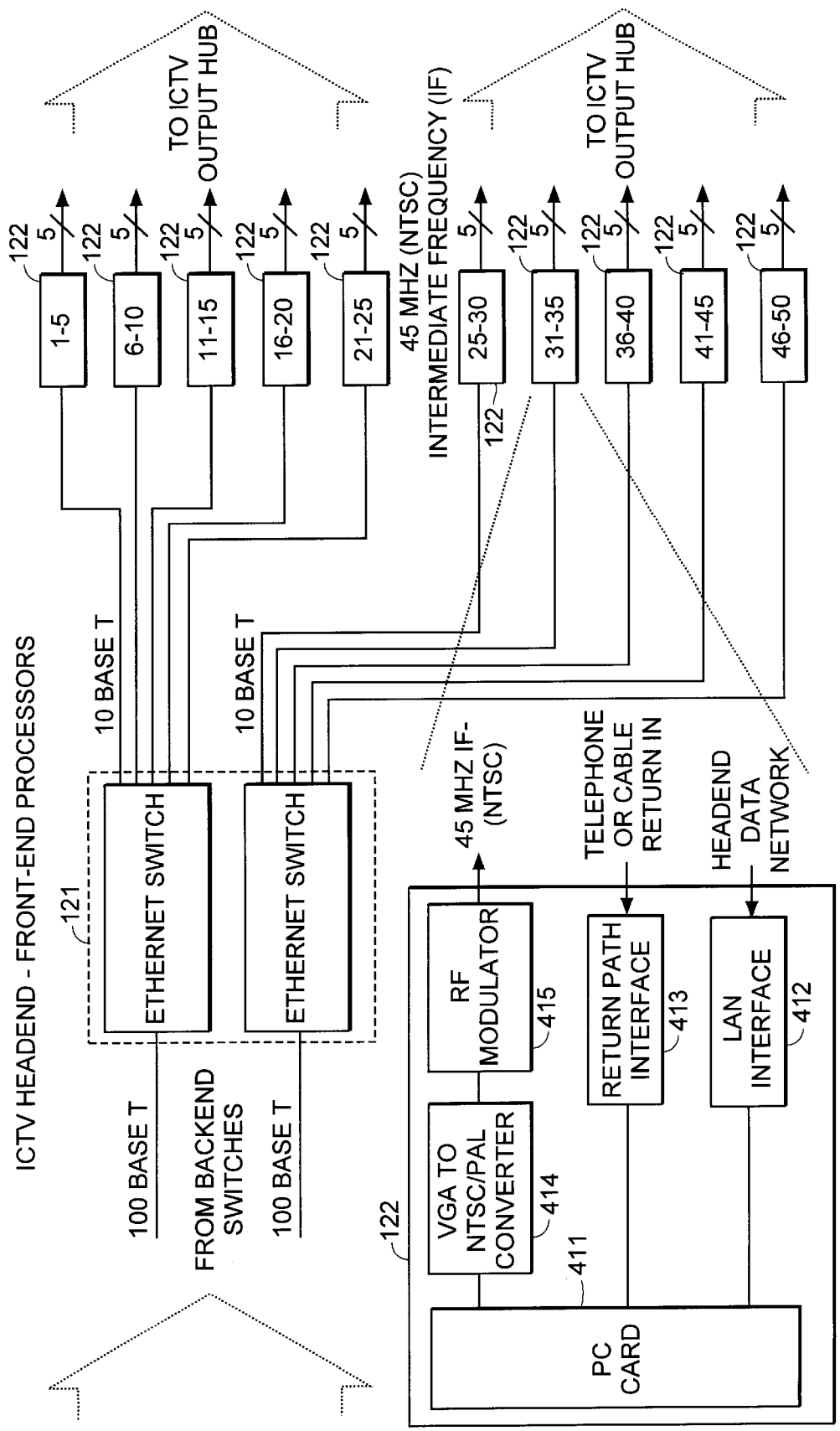
FIG. 4 illustrates an embodiment of the front end of FIG. 1.

An embodiment of front end 12 is shown in FIG. 4. Ethernet switches 121 are connected to PMMs 122 through a LAN interface 412 at each PMM. A PMM 122 typically includes an SBC PC (single board computer personal computer) card 411 for running an interactive program. A return path interface 413 receives communications from the home interface controllers through the return path whether it be the cable or a telephone line. A VGA to NTSC/PAL converter 414 produces a signal that can produce a picture on a television. Scrambling may be provided by a complete scrambler 124 assigned to the PMM or, alternatively, scrambling may be distributed so that only one complete scrambler is required per channel frequency. Each PMM then only needs sync suppression and a conditional access code inserter obtaining the conditional access code from the complete scrambler for the respective channel frequency. Distributed scrambling is described in a patent application entitled "Distributed Scrambling Method and System," filed on the same date herewith and having the same assignee as the present application, the full disclosure of which is hereby incorporated by reference herein. An RF modulator 415 puts the NTSC or PAL signal on an intermediate frequency, preferably 45 MHz, for supply to switching output RF hub 13.

Figure 5:
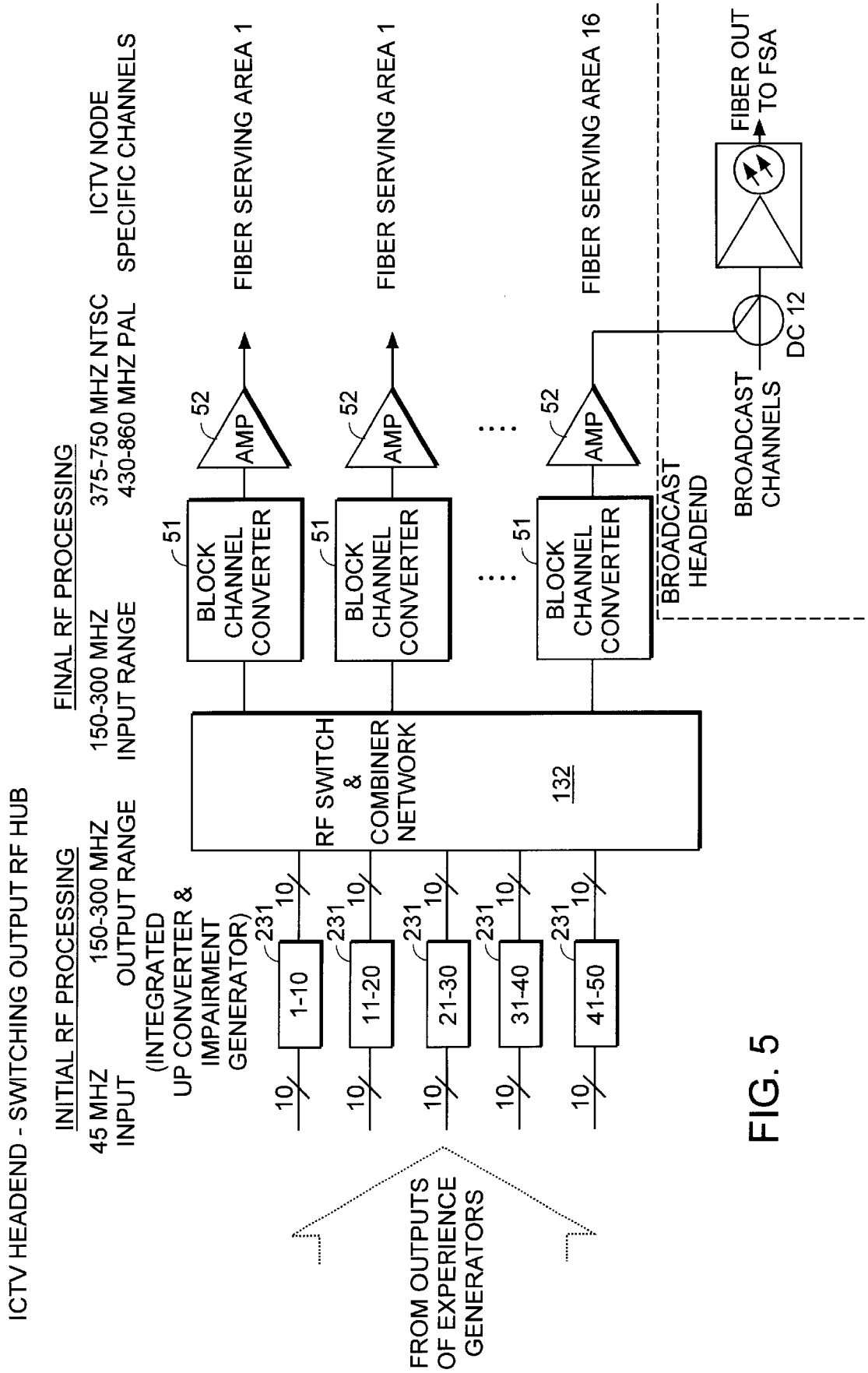
FIG. 5 illustrates an embodiment of the switching output RF hub of FIG. 1.

An embodiment of switching output RF hub 13 is shown in FIG. 5. Initial RF processing is performed by 231, which are essentially integrated up-converters, converting 45 MHZ input to an output in the range of 150 to 300 MHZ. RF switch and combiner network 132 provides the output of 231 to final RF processing 231, which in FIG. 5 are indicated by block channel converters 51 and amplifiers 52.

Figure 6:
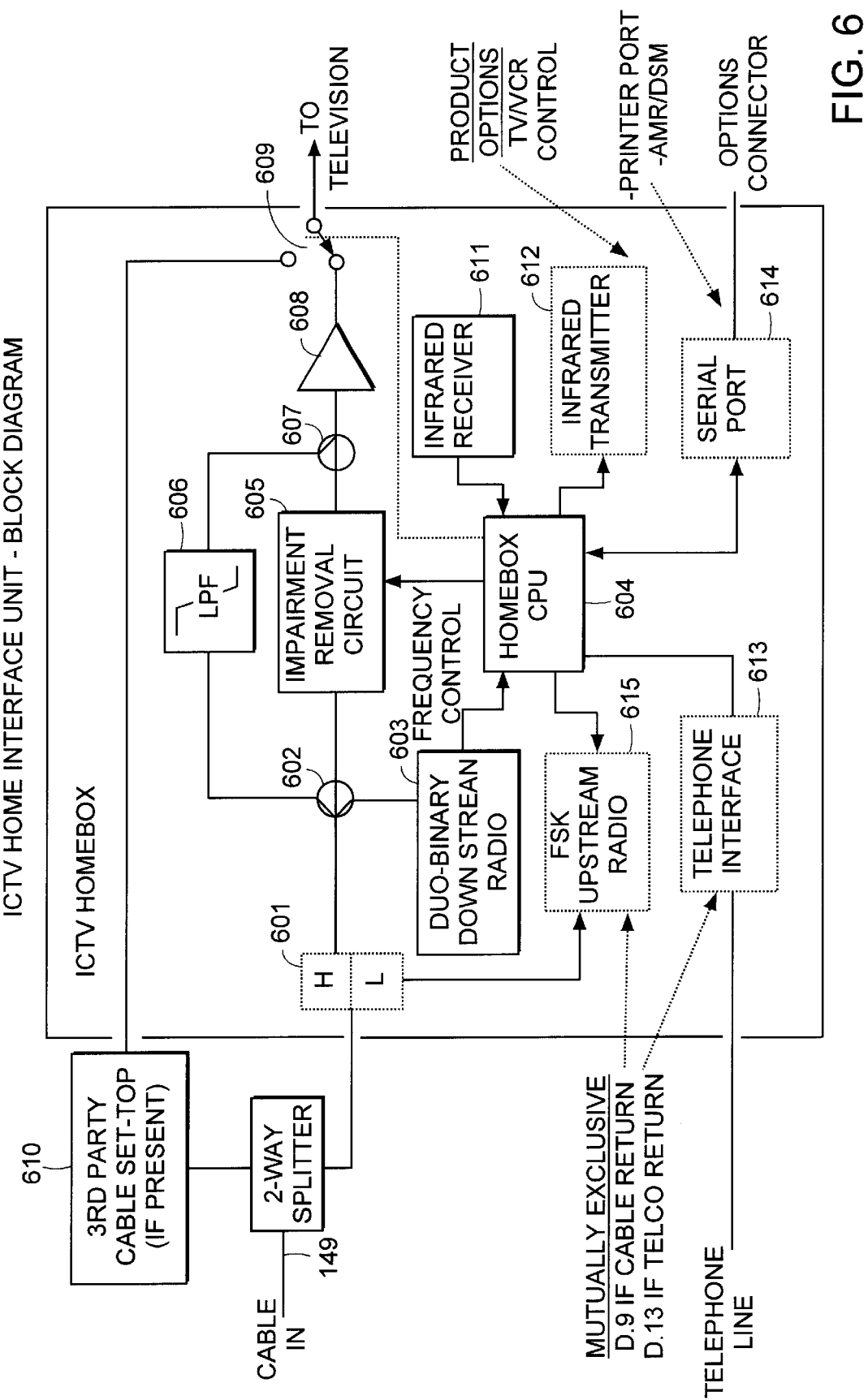
FIG. 6 illustrates an embodiment of a home interface controller for use in connection with the embodiment of FIG. 1.

An embodiment of a home interface controller is shown in FIG. 6. A cable 149 carrying the television signals, such as drops 149a, 149b, and 149c of FIG. 1, is connected to a two-way splitter which may also be connected to a cable set-top provided by a third party. A diplex filter and combiner 601 provide a first frequency path to splitter 602 and a second frequency path to FSK (frequency shift-key) radio 615, where the first frequency path occupies a higher spectral region than the second frequency path. The first frequency path provides a downstream path for signals going from front end 12 to the user of the home interface controller whereas the second frequency path provides an upstream path for signals going from the user to front end 12.

Splitter 602 provides a signal path to low pass filter 606 and an impairment removal circuit 605. The outputs of 602 and 605 are re-combined at combiner 607, then amplified by amplifier 608. Switch 609 allows the user of the home interface controller to switch between the signal output of amplifier 608 and the output of the third party set-top 610 (if present). Switch 609 may also be under control of home box CPU 604.

Home box CPU 604 provides control and communication signals to impairment removal circuit 605, duo-binary down stream radio 603, FSK upstream radio 615, telephone interface 613, serial port 614, infrared transmitter 612, and infrared receiver 611. Infrared transmitter 612 and infrared receiver 611 provide communication between the home interface controller and a subscriber selection device, which may be, for example, a keyboard. Serial port 614 may provide communication with a printer for hard copy printouts. FSK upstream radio 615 is a modulator for providing a data communication link between the interface controller and front end 12. Collectively, the upstream radio 615 and the downstream radio 603 constitute the transmitter and receiver, respectively, of a data transceiver. Telephone interface 613 also can provide communication over ordinary telephone lines.

Figure 7A:
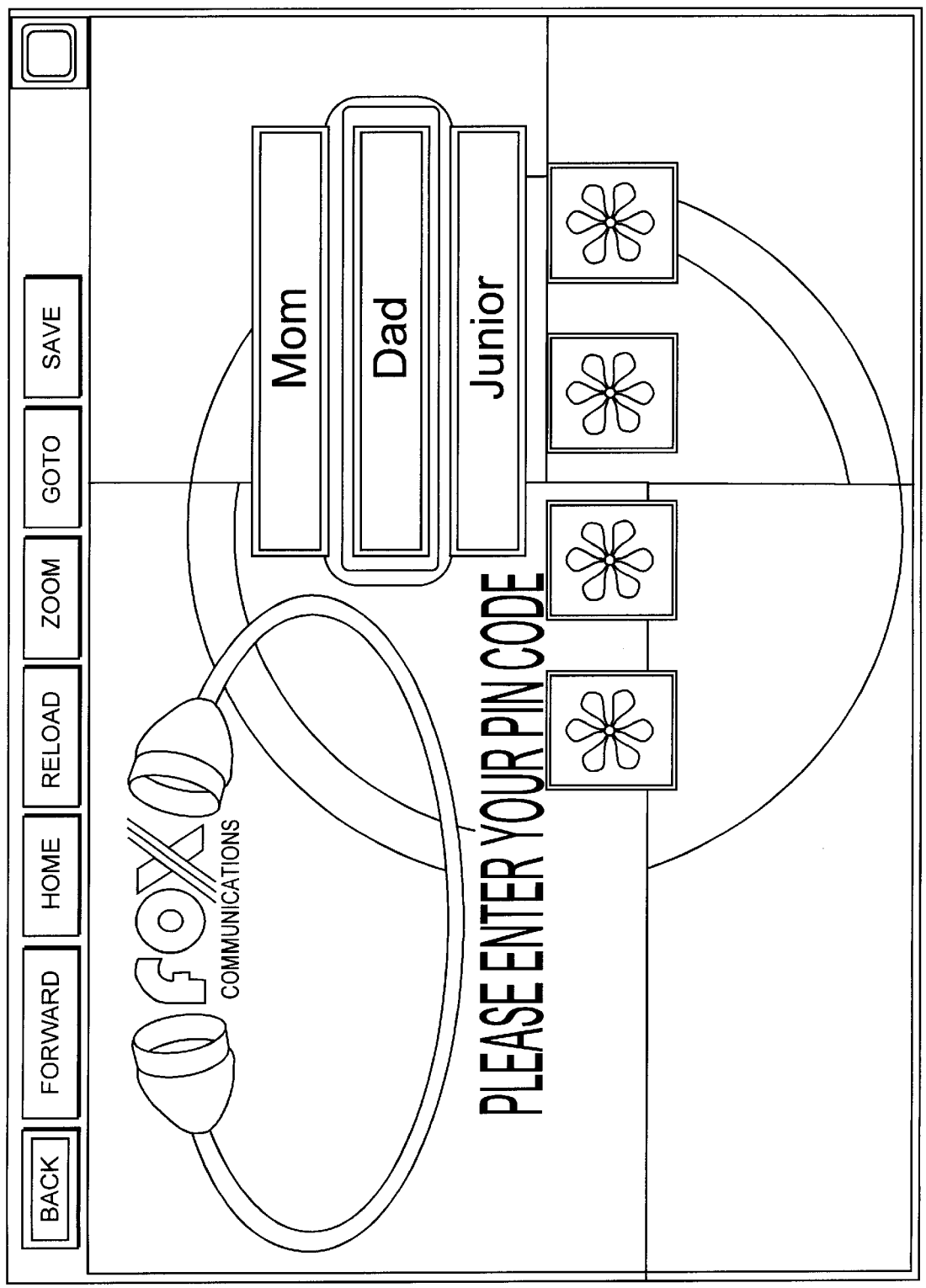
FIGS. 7A–7F illustrate examples of subscriber television screen displays during an interactive session.
Figure 7B:
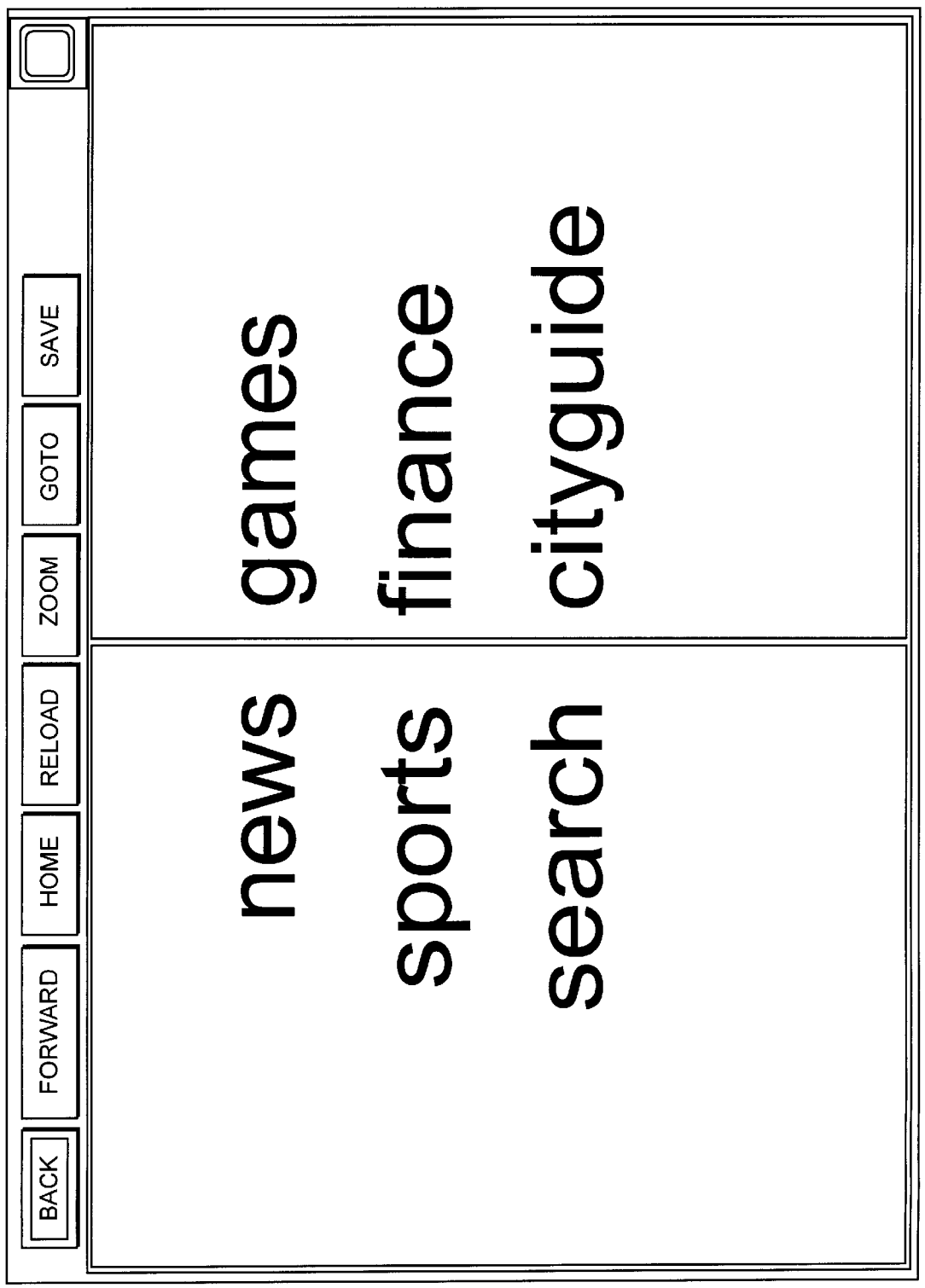
Figure 7C:
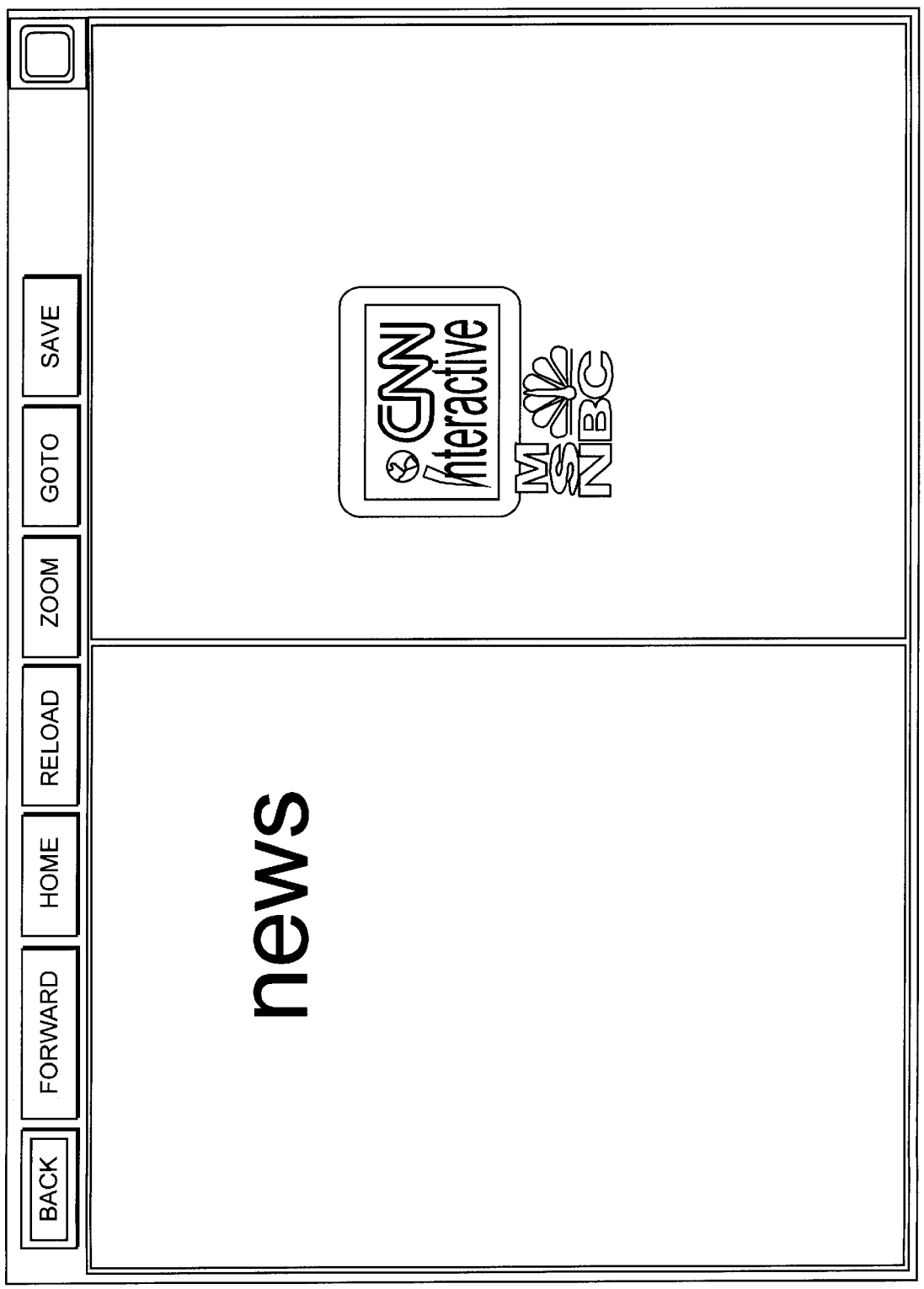
Figure 7D:
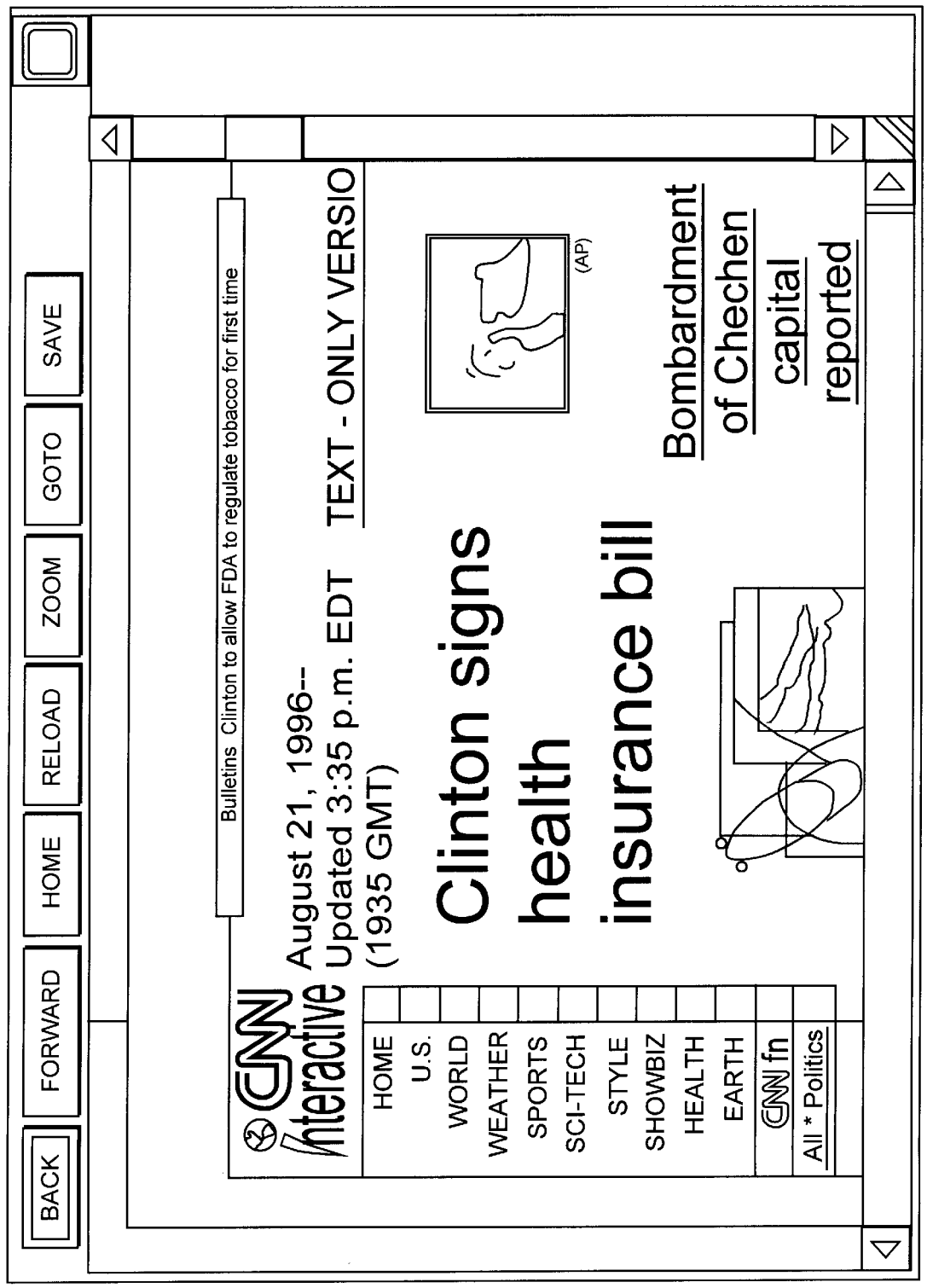
Figure 7E:
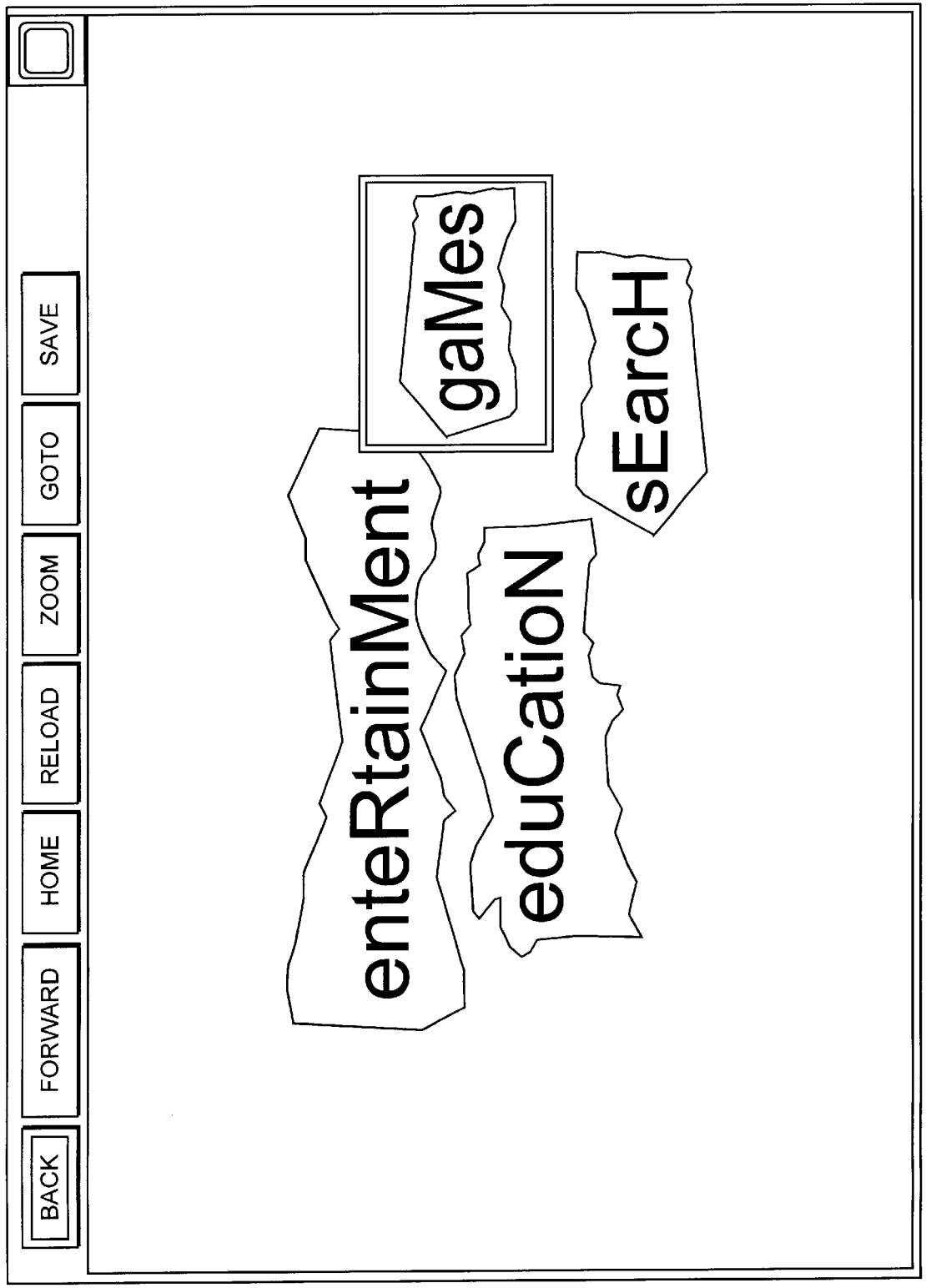
Figure 7F:
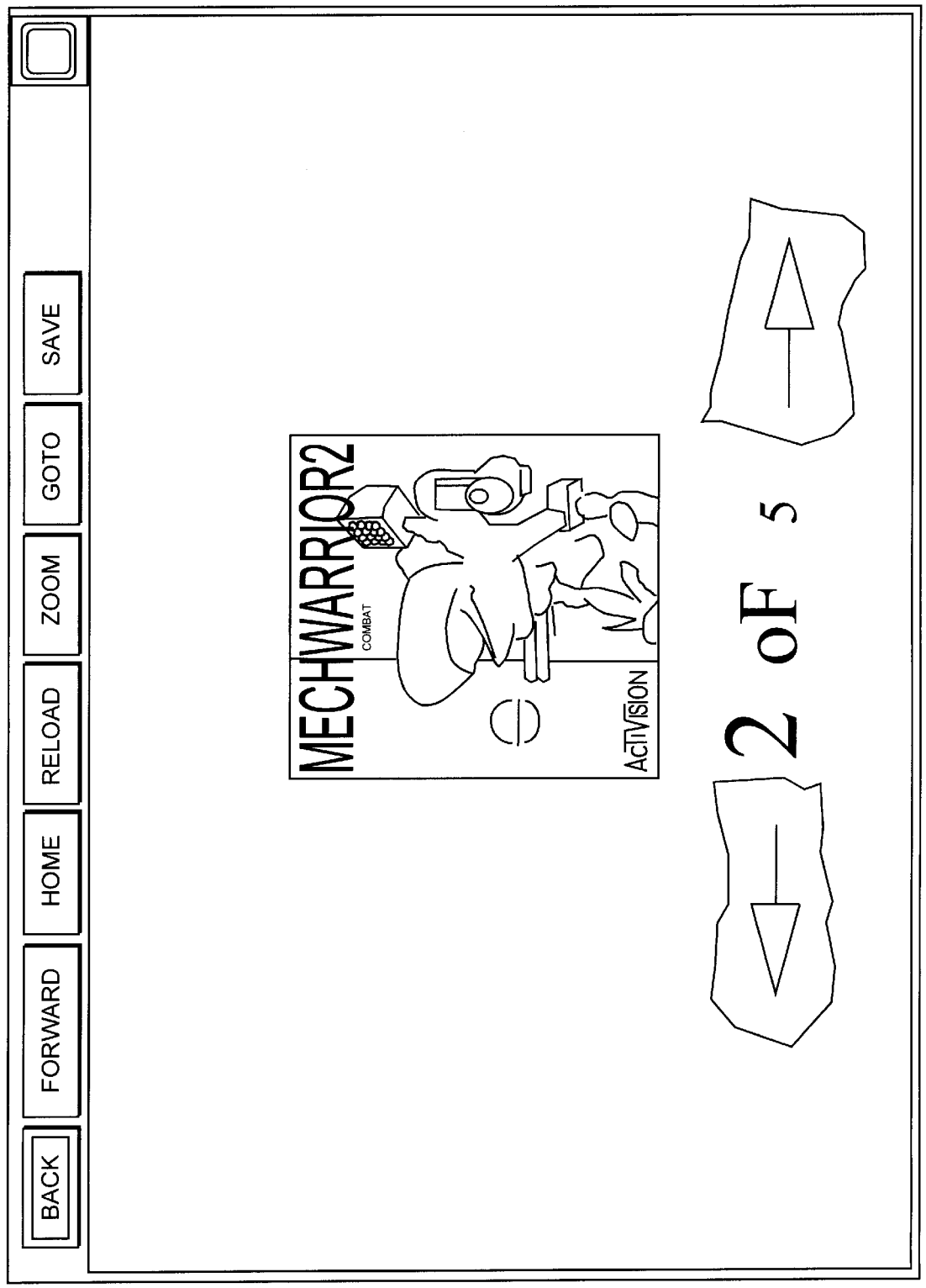

When a user of the home interface controller requests an interactive service from head end 12, such as Internet service or a video game, an appropriate PMM is placed in use for providing the service to the user. The user selects the desired service by using the subscriber selection device in conjunction with the home interface controller. Examples of screen displays available to the user for selection of a service are illustrated in FIGS. 7A–7F. FIG. 7A shows a beginning display, in which front end 12 requests appropriate information from the user, including a PIN code number. In this way, for example, children may be blocked from requesting unsuitable video content. Once the back end identifies the user (this will be discussed in more detail later), various options are available, as shown in FIG. 7B. FIG. 7C shows a screen in which the "news" option of FIG. 7B has been chosen. In FIG. 7C, once the user has decided to choose a news program, the user may decide to choose CNN or MSNBC. FIG. 7D shows the screen when the user has selected the CNN option of FIG. 7C. FIG. 7E is similar to FIG. 7B, except that this screen appears when the "Junior" button and appropriate PIN code is entered in FIG. 7A. FIG. 7E shows the screen that results when the "gaMes" button in FIG. 7E is entered. It should be noted that the interaction here is via an Internet-type browser, which permits not merely surfing the Internet, but actually selecting different information services using hyperlinks.

FIG. 8 illustrates a system diagram for system manager 113, indicating the two functions of (1) call set-up and tear down and (2) resource allocation with the interactive TV system of FIG. 1. Call set-up is the process of causing the assignment of a television information signal path to the home interface controller for interactive service, and resource allocation is the process of assigning appropriate PMM cards and virtual circuits within the switching system in the back end.

Call set-up is initiated by a small program in the home interface controller which keeps track of the channel the user is watching. The channels are broken into bands where, for instance, channels 2 through 73 are assigned regular TV programming both off-air TV channels as well as cable channels such as MTV, HBO, CNN, etc. The band above this broadcast band uses channels 74 to 79, for instance, for interactive services where a user is assigned one of these channels only during the duration of that user's interaction with the interactive TV system (i.e.—while looking up a restaurant in the entertainment guide, or while watching a movie, etc.). A user may tune from a broadcast channel (e.g.—ch. 37 CNN) to an interactive service virtual channel, at which time the user will be provided with the screen displays of the type shown, for example, in FIGS. 7A through 7F. When the user selects interactive service, the small program in the home interface controller sends a signal to the system manager at the back end to initiate call set-up.

The system manager in back end 11 begins the call set-up process through a system manager subsystem called the call setup server (CSS) 80. The CSS 80 finds a free interactive element or selection element corresponding to the virtual channel number the user is trying to tune to. As an example, assume the user is interested in movie previews which are viewed through interacting with a PMM and a program run on service "A" application process 811. The CSS 80 will call a video path manager subroutine to check for an available television information channel within the band of television information signals allocated to provide interactive service to the neighborhood of the requesting user. The newly assigned television information signal of the requesting user and the user's network address is passed to a service allocation server (SAS) 81 associated with the application process.

Assuming a non-blocked call, the system management function has now passed from the CSS 80 sub-system to the SAS 81 (for this example). The CSS 80 is now out of the loop. The SAS 81 checks for a free resource, i.e., a processor for running a service application process. If one is available, control is passed to it along with the assigned television information signal and address of the calling user. The processor, in this example, is a PMM card 122. The service application process run by the PMM sends a request to the application support server 87 for subscriber information to authenticate the user id for the neighborhood from which the signal is originating. The service application process also requests subscriber information from the application support server 87 customer database to check for paid-up service and/or access to service permission (e.g.—used to block children from viewing R rated movie previews, for one example). Upon success, the service application process directs the conditional access controller (CAC) 86 to send a descramble key code to the user's set-top converter to allow it to descramble the video signal that the service application process will be using. The service application process also communicates directly with the set-top in-home operations process (IHOP) 85, informing the program of the assigned television information signal. The home interface controller operates the in-home operations process. A separate processor in the set-top receives the descrambling keys and translates them.

The set-top IHOP 85, upon receiving the assigned channel, tunes the cable TV set-top to the assigned channel. The user will see the output of the SAP 811 and can begin using the remote control to manipulate the program running on the SAP 811. The in-home operation process 85 transmits appropriate remote control commands addressed to the processor/process assigned to it. When the user tunes to a broadcast TV channel, the call take down process is initiated by the set-top system manager extension signaling the 811 that the user has tuned away, and, after a time-out period (for instance, five minutes), the 811 signals the call set-up server 80 to release the interactive virtual channel previously assigned. The virtual channel is logged back into the free channels list by the CSS 80. At the same time, the SAP 811 signals the SAS 81 that it is now a free resource and the SAS places the PMM that had provided the application process on its free card list.

The example above is the same for other kinds of PMMs for interactive multimedia, such as internet service cards 222, video game player cards 225, and MPEG-to-video decoder cards 227. A PMM card can be used for a front end application such as movie previewing and purchasing. When the user picks a movie using a PMM, the PMM will then pass control of the user to a control program that manages movie playback and decompression (MPEG2 to NTSC). then the movie is over, the movie playback control program follows the same steps of call take down as the PMM did.

The above system management scheme can accommodate any number of diverse services in a fully distributed manner such that there are no bottlenecks in the system. This affords optimal performance in response to user requests. By distributing the processing of communications with home interface controllers throughout system management, a greater amount of processing can be conducted in less time with less expensive processing units.

System management may include separate service allocation servers 81 or 82 for each of the switched channel system, the digital interactive elements, and the analog interactive elements. Moreover, there may be additional service allocation servers further dividing the interactive elements into groups according to the type of interactive service provided. Thus, there may be a service allocation server for movies only, for games, and for catalogs. The service allocation servers act as intermediaries between the call set-up server and the video provider elements whether they be internet service cards 222, video game player cards 225, or MPEG-to-video decoder cards 227. The service allocation servers provide distributed management. The call set-up server 80 can pass the call set-up to the appropriate service allocation server. As the service allocation server identifies a video provider element and completes the connection with the home interface controller, the call set up server can be attending to the next caller.

As mentioned above, the user interface may be provided with hyperlinks which when activated permit selection of different information services. For example, a user interacting with a catalog may find a hyperlink to a movie, which when selected puts the user in connection with a movie service. The hyperlink institutes a routine which causes a hand-off from the service allocation server handling catalogs to the service allocation server handling movies. Such a routine may begin by having the currently assigned service allocation server ask the target service allocation server if it can accept a new user. If not, the user may need to wait before the hyperlink can be completed. If available, the current service allocation server passes user identification information to the target service allocation server and terminates the current session freeing up the current service application process. The target service allocation server assigns a processor to the user for running a service application process (to play a movie in the example). If a channel change is necessitated, the video path manager is involved and the home interface controller of the user is informed of the new channel. Communication proceeds between the home interface controller and the newly assigned service application process.

The communications gateway 83 acts as a translator between the IHOP 85 and the back end 11 LAN connecting the distributed processes of the system manager. The communications gateway 83 translates the IHOP address from an individual user into a global Internet Protocol (IP) address for addressing ethernet data packets within the back end LAN. IP is part of TCP/IP. Communications are directed from the communications gateway 83 to the application process directly. Once the service allocation server assigned to a home interface controller has put the home interface controller in communication with the requested application process, the communications can be handled directly. The control of the switched channel system is simple in that it is only necessary to put the requested information service on the assigned television information signal. The interactive elements require greater processing requirements as interactive communications continue throughout a session. System management is also required to maintain administrative tasks such as billing. Each of the service application processes is in communication with a transaction interface process so that billing and credit and other financial matters can be taken care of.

FIG. 9 illustrates a flow diagram for a call set-up and tear down procedure as shown in FIG. 8. In FIG. 9, step 91 indicates that a request for an interactive service from a home interface controller is made on a hailing frequency. The hailing frequency need only occupy a relatively small bandwidth at a relatively low carrier frequency (compared to ordinary television signals). In step 92, the gateway receives the request from the user and transmits a private frequency (approximately 25 kHz bandwidth) assignment to the home interface controller to be used for upstream data. In step 93, the gateway also converts the private address to an IP address, as discussed in relation to FIG. 8. In step 95, the system manager hands off to the call set-up server, and in step 951, the call set-up server hands off to the service A (for example) allocation server. In step 952, the service allocation server hands off to the video path manager to identify an open TV channel to assign to the home interface controller. In step 953, the video path manager hands off to service A application process to identify an available PMM to run service process A and to assign to the home interface controller requesting the requested service. In step 954, the assigned PMM provides an interactive menu and, if selected, Internet Web service is provided via an application support server (proxy server). Step 96 indicates that a newly requested service is handled by service A allocation server. If a new service is requested, then in step 97 the service A allocation server hands off to the call set-up server, and in step 98 the call set-up server hands off to the appropriate service allocation server. Step 99 indicates that additional processing maybe necessary, depending upon the requested service (as discussed in relation to FIG. 8). Application processing is terminated in step 991 when the interactive service is completed, whereupon in step 992 the assigned TV channel is returned to the pool of available channels to the video path manager. Also, upon completion of the interactive service, the assigned PMM is also made available to the pool of available service application processors. In step 994, the assigned frequency is returned to the pool of available frequency assignments so that the gateway can re-use the frequency for upstream data from another home interface controller.

Figure 10:
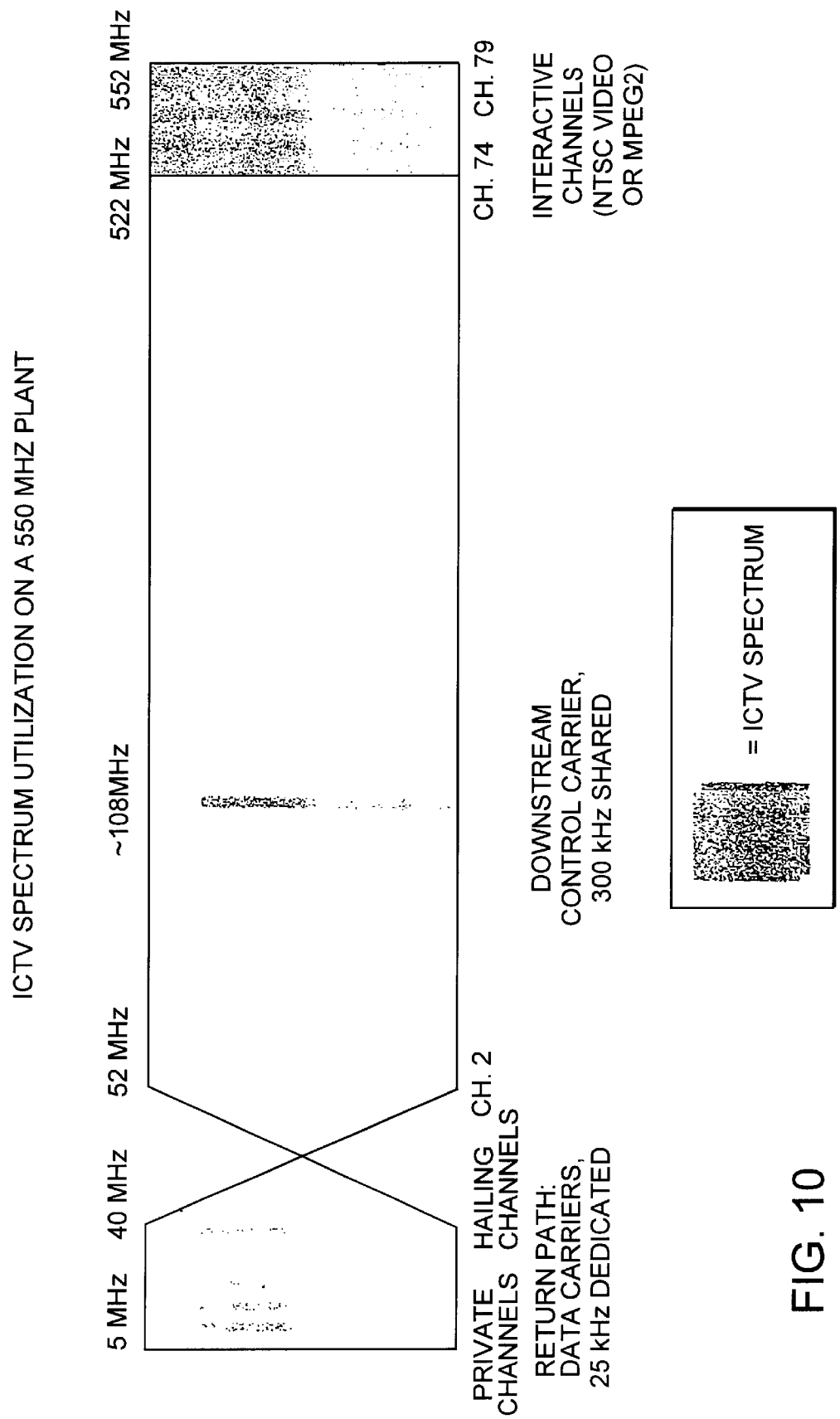
FIG. 10 illustrates the frequency spectrum of the various signals used by a cable television system of FIG. 1.

FIG. 10 indicates the frequency spectrum of the various signals used by the television system. The spectrum to the left of the left-to-right arrow in FIG. 10 indicates upstream data, whereas the spectrum to the right of the right-to-left arrow in FIG. 10 indicates downstream data. Interactive channels (NTSC video or MPEG2) are in channels 74–79 (522 MHZ to 552 MHZ). Upstream data has a small bandwidth of 25 kHz in the frequency range of 5 MHZ to 40 MHZ.

Figure 11:
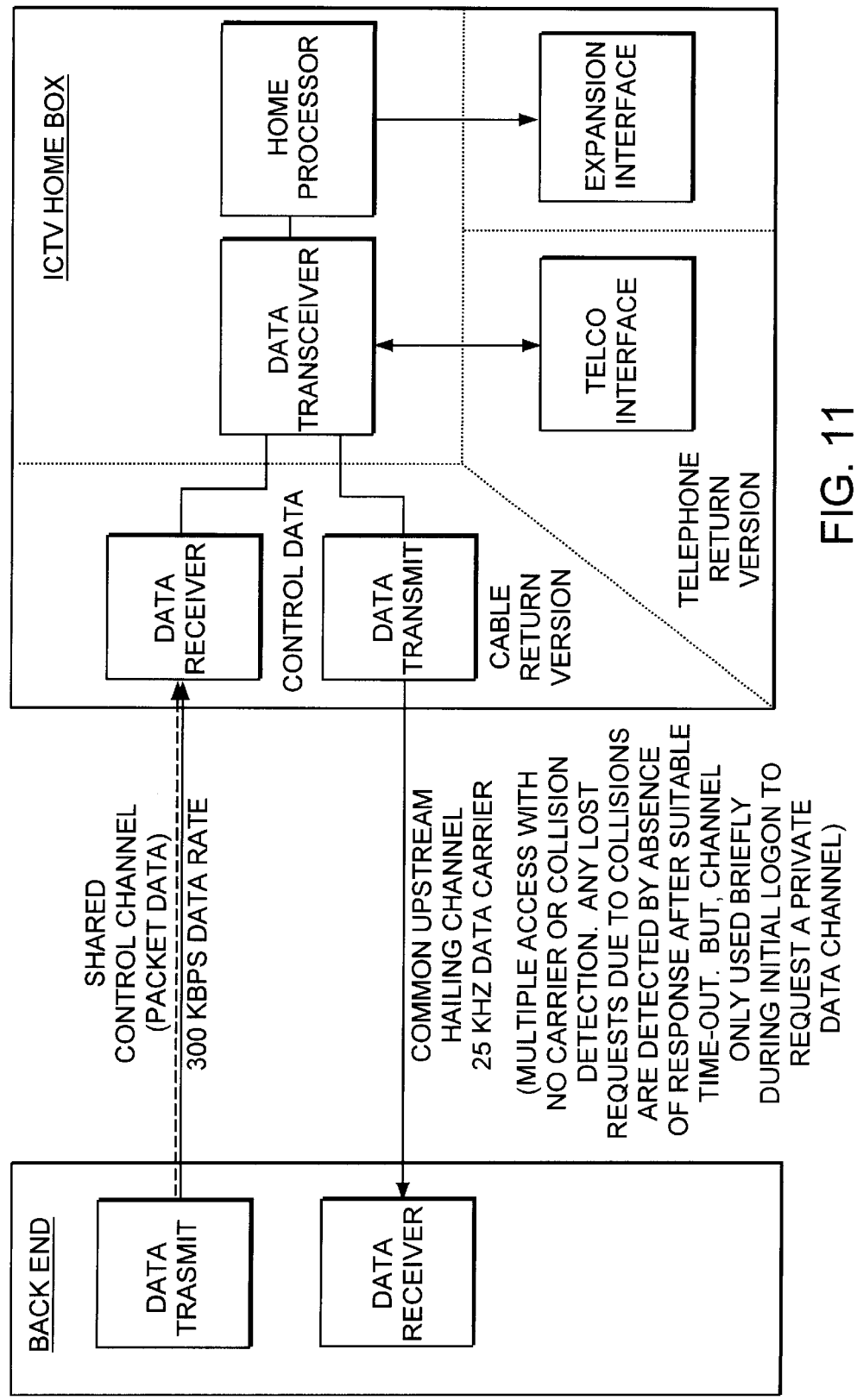
FIG. 11 is a high-level diagram of a home interface controller in communication with the back end.
Figure 12:
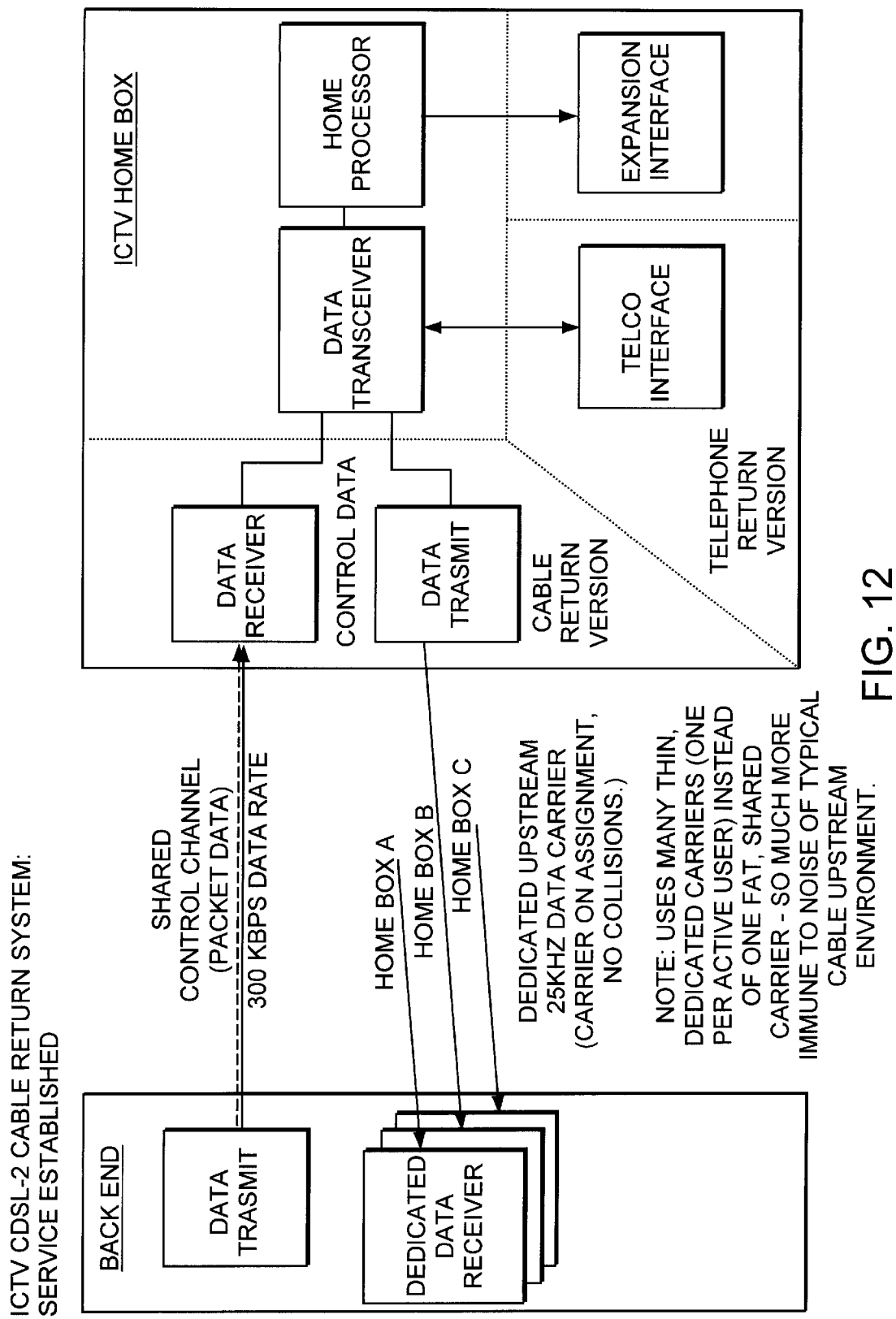
FIG. 12 is a high-level diagram illustrating a cable return system.

FIG. 11 shows a high-level diagram of the home interface controller in communication with the back end. In this embodiment, downstream data is in the form of packet data on a 300 Kbps data channel. When providing upstream data, the home interface controller uses a dedicated upstream channel requiring only a 25 kHz bandwidth for each home interface controller, so as to provide noise immunity. FIG. 11 is similar to FIG. 10, except that a common upstream channel is used by all the home interface controllers for hailing the back end. No carrier or collision detection algorithms are employed, but rather, any lost requests due to collisions among the home interface controllers are "detected" by an absence of response from the back end after a suitable time-out. This common upstream channel is used only briefly during and initial log-on to request a private data channel, where the private data channel is indicated in FIG. 12. As an alternative to the use of a hailing channel, the system manager may include an arrangement for the periodic broadcast, from the headend over a downstream portion of the data link to the home interface controllers, identifying of available channels; in this embodiment, each home interface controller has a rule for picking one of the available channels for use by the transmitter of its data transceiver.

What is claimed is:

1. A system manager for use with an interactive cable system, the cable system having (i) an information service network, for delivering information services to subscriber televisions, (ii) a plurality of home interface controllers, each home interface controller associated with a subscriber television and having a data transceiver operative over a data communications link to the headend, (iii) a plurality of subscriber selection devices, each such device associated with a home interface controller and in communication with the data transceiver thereof, for permitting subscriber interaction, and (iv) a plurality of interactive controllers, disposed at the headend, each interactive controller in assignable television communication over the network with a subscriber television and in data communication with a subscriber selection device, the system manager comprising:

a call set-up server to receive and handle an initial data exchange with a calling home interface controller; and a first service allocation server to pass communication and control associated with the calling home interface controller to one of a plurality of first application processors, each first application processor being one of the interactive controllers, to provide a first information service;

wherein the call set-up server and the first service allocation server operate as independent processes;

a second service allocation server to pass communication and control associated with a home interface controller seeking a second information service to an available one of a plurality of second application processors, each second application processor being one of the interactive controllers, to provide the second information service;

wherein the second service allocation server operates as an independent process.

2. A system manager according to claim 1, wherein the first service allocation server maintains a list of available first application processors and the second service allocation server maintains a list of available second application processors.

3. A system manager according to claim 1, wherein (1) an interactive controller in assigned television communication with the calling home interface controller causes display on the subscriber television associated with the calling home interface controller of a page having at least one hyperlink to an additional page and (2) selection of such a hyperlink by the selection device associated with the calling home interface controller causes a transfer between one of the first and second service allocation servers to the other of them so as to cause a change in the information service provided to such subscriber television.

4. A system manager according to claim 3, wherein the page and the additional page are created in HTML format.

5. A system manager for use with an interactive cable system, the cable system having (i) an information service network, for delivering information services to subscriber televisions, (ii) a plurality of home interface controllers, each home interface controller associated with a subscriber television and having a data transceiver operative over a data communications link to the headend, (iii) a plurality of subscriber selection devices each Such device associated with a home interface controller and in communication with the data transceiver thereof, for permitting subscriber interaction, and (iv) a plurality of interactive controllers, disposed at the headend, each interactive controller in assignable television communication over the network with a subscriber television and in data communication with a subscriber selection device, the system manager comprising:

a call set-up server to receive and handle an initial data exchange with a calling home interface controller; and a first service allocation server to pass communication and control associated with the calling home interface controller to one of a plurality of first application processors, each first application processor being one of the interactive controllers, to provide a first information service;

wherein the call set-up server and the first service allocation server operate as independent processes;

wherein the first service allocation server maintains a list of available first application processors.

6. A system manager for use with an interactive cable system, the cable system having (i) an information service network, for delivering information services to subscriber televisions, (ii) a plurality of home interface controllers, each home interface controller associated with a subscriber television and having a data transceiver operative over a data communications link to the headend, (iii) a plurality of subscriber selection devices, each such device associated with a home interface controller and in communication with the data transceiver thereof, for permitting subscriber interaction, and (iv) a plurality of interactive controllers, disposed at the headend, each interactive controller in assignable television communication over the network with a subscriber television and in data communication with the home interface controller associated with the subscriber television, the system manager comprising:

a first service allocation server to pass communication and control associated with a calling home interface controller to one of a plurality of first application processors, each application processor being one of the interactive controllers, to provide a first information service;

a second service allocation server to pass communication and control associated with a home interface controller seeking a second information service to an available one of a plurality of second application processors, each second application processor being one of the interactive controllers, to provide the second information service;

each of the first and second service allocation servers operating as an independent process.

7. A system manager according to claim 6, wherein (1) an interactive controller in assigned television communication with the calling home interface controller causes display on the subscriber television associated with the calling home interface controller of a page having at least one hyperlink to an additional page and (2) selection of such a hyperlink by the selection device associated with the calling home interface controller causes a hand-off between one of the first and second service allocation servers to the other of them so as to cause a change in the information service provided to such subscriber television.

8. A system manager according to claim 7, wherein the page and the additional page are created in HTML format.

9. A system manager for use with an interactive cable system, the cable system having (i) an information service network, for delivering information services to subscriber televisions, (ii) a plurality of home interface controllers, each home interface controller associated with a subscriber television and having a data communications link to the headend, (iii) a plurality of subscriber selection devices, each such device associated with a home interface controller, for permitting subscriber interaction, and (iv) a plurality of interactive controllers, disposed at the headend, each interactive controller in assignable television communication over the network with a subscriber television, the system manager comprising:

a first service allocation server to pass communication and control associated with a calling home interface controller to one of a plurality of first application processors, each application processor being one of the interactive controllers, to provide a first information service;

a second service allocation server to pass communication and control associated with a home interface controller seeking a second information service to an available one of a plurality of second application processors, each second application processor being one of the interactive controllers, to provide the second information service;

each of the first and second service allocation servers operating as an independent process;

wherein (1) an interactive controller in assigned television communication with the calling home interface controller causes display on the subscriber television associated with the calling home interface controller of a page having at least one hyperlink to an additional page and (2) selection of such a hyperlink by the selection device associated with the calling home interface con troller causes a hand-off between one of the first and second service allocation servers to the other of them so as to cause a change in the information service provided to such subscriber television.

10. A system manager according to claim 9, wherein the page and the additional page are created in HTML format.

11. A system manager for use with an interactive cable system, the cable system having (i) an information service network, for delivering information services to subscriber televisions, (ii) a plurality of home interface controllers, each home interface controller associated with a subscriber television and having a data transceiver, operative over a data communications link to the headend, with a transmitter having a tunable carrier frequency;

(iii) a plurality of subscriber selection devices, each such device associated with a home interface controller and in communication with the data transceiver thereof, for permitting subscriber interaction, and (iv) a plurality of interactive controllers, disposed at the headend, each interactive controller in assignable television communication over the network with a subscriber television and in data communication with a subscriber selection device, the system manager comprising:

a data path manager for maintaining a list of available data channels for upstream communications from a calling home interface controller to the headend and preventing simultaneous use of a channel by more than one home interface controller; and an assignment system by which the transmitter in the data transceiver of a calling home interface controller is caused to tune to an available channel wherein the assignment system includes an arrangement for the periodic broadcast, from the headend over a downstream portion of the data link to the home interface controllers, identifying available channels, and the home interface controller has a rule for picking one of the available channels for use by the transmitter in the data transceiver of a calling home interface controller.

* * * * *